US012718606B2

(12) United States Patent
Meyer et al.

(10) Patent No.: US 12,718,606 B2
(45) Date of Patent: Aug. 25, 2026

(54) ANNOTATION ALIGNMENT ALGORITHM ANALYSIS FOR CHARACTER RECOGNITION

(71) Applicant: SAP SE, Walldorf (DE)

(72) Inventors: Christoph Meyer, Berlin (DE); Xiang Yu, Berlin (DE)

(73) Assignee: SAP SE, Walldorf (DE)

( * ) Notice: Subject to any disclaimer, the term of this patent is extended or adjusted under 35 U.S.C. 154(b) by 353 days.

(21) Appl. No.: 18/375,952

(22) Filed: Oct. 2, 2023

(65) Prior Publication Data

US 2025/0111687 A1 Apr. 3, 2025

(51) Int. Cl.
*G06V 30/146* (2022.01)

(52) U.S. Cl.
CPC .................................. *G06V 30/146* (2022.01)

(58) Field of Classification Search
CPC ............................ G06V 30/146; G06V 30/10
See application file for complete search history.

(56) References Cited

U.S. PATENT DOCUMENTS

2010/0250523 A1* 9/2010 Jin ........................ G06F 16/951 707/723
2015/0026556 A1* 1/2015 Stadermann .......... G06F 40/183 715/227
2017/0337167 A1* 11/2017 Byron ..................... G06F 16/93
2021/0319183 A1* 10/2021 Zhao ..................... G06F 40/295

FOREIGN PATENT DOCUMENTS

CN 102999938 B * 3/2018 ........... G06V 10/803
CN 110533086 A * 12/2019 ............. G06N 20/00
CN 111738004 A * 10/2020 ........... G06F 40/295

* cited by examiner

*Primary Examiner* — Huo Long Chen
(74) *Attorney, Agent, or Firm* — Klarquist Sparkman, LLP

(57) ABSTRACT

Systems and processes for evaluating algorithms for aligning weakly-annotated data to recognized characters in a document are provided. In a method for evaluating an algorithm for aligning annotation data to recognized characters, strong annotations and weak-to-strong annotations, which are generated by applying a weak-to-strong annotation alignment algorithm, for a document are received and matched to generate respective pairs of matched annotations. For each pair of matched annotations, respective metrics are calculated including comparisons of aspects of the strong annotations to the weak-to-strong annotations. The respective metrics are aggregated, and an indication of the aggregated metrics are output to a graphical user interface or targeted application. Aggregated metrics determined for different weak-to-strong annotation alignment algorithms may be compared in order to select or adjust an algorithm to be used for Optical Character Recognition (OCR) operations.

20 Claims, 11 Drawing Sheets

Figure 3:
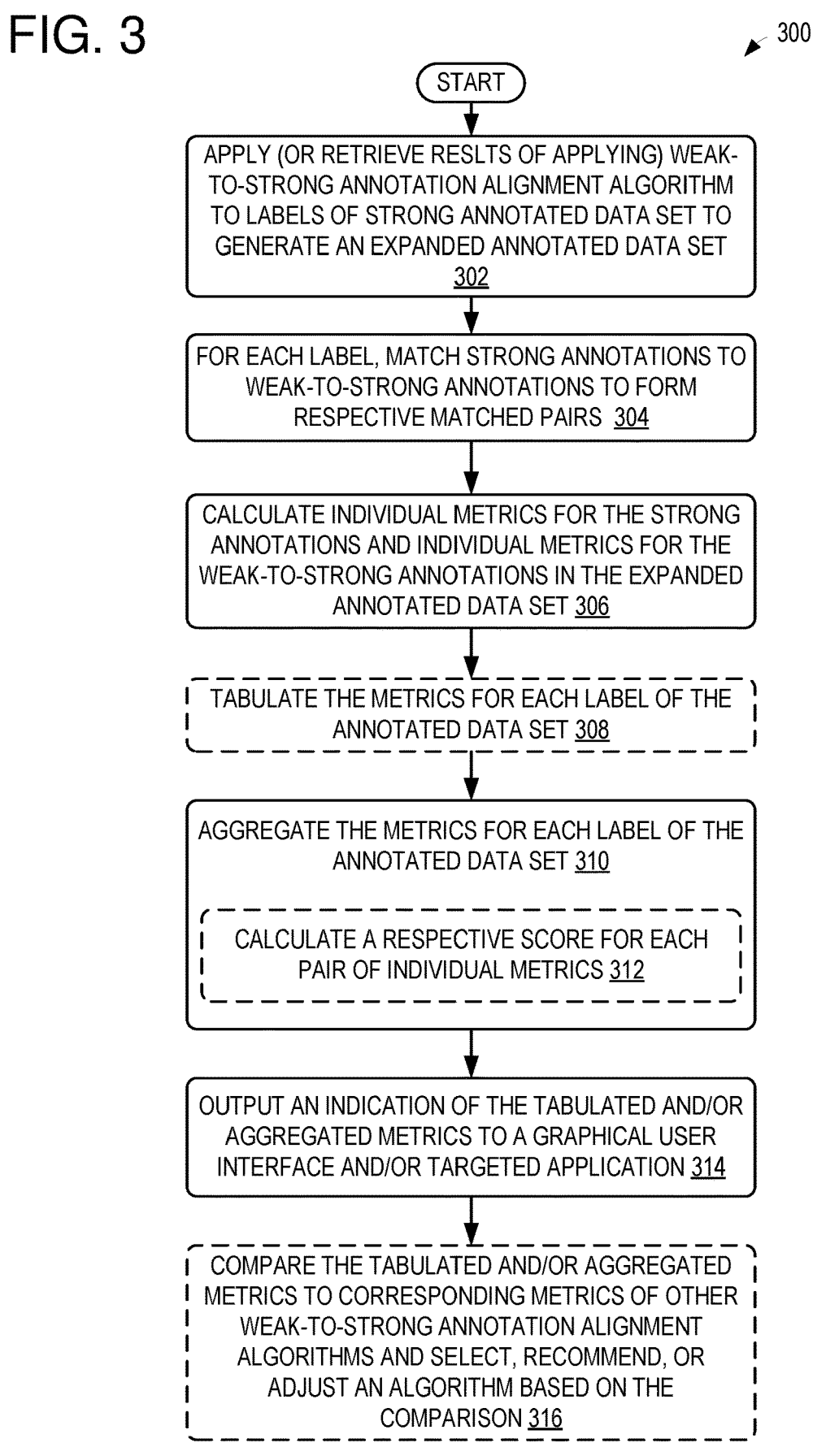

START

APPLY (OR RETRIEVE RESLTS OF APPLYING) WEAK-TO-STRONG ANNOTATION ALIGNMENT ALGORITHM TO LABELS OF STRONG ANNOTATED DATA SET TO GENERATE AN EXPANDED ANNOTATED DATA SET 302

FOR EACH LABEL, MATCH STRONG ANNOTATIONS TO WEAK-TO-STRONG ANNOTATIONS TO FORM RESPECTIVE MATCHED PAIRS 304

CALCULATE INDIVIDUAL METRICS FOR THE STRONG ANNOTATIONS AND INDIVIDUAL METRICS FOR THE WEAK-TO-STRONG ANNOTATIONS IN THE EXPANDED ANNOTATED DATA SET 306

TABULATE THE METRICS FOR EACH LABEL OF THE ANNOTATED DATA SET 308

AGGREGATE THE METRICS FOR EACH LABEL OF THE ANNOTATED DATA SET 310

CALCULATE A RESPECTIVE SCORE FOR EACH PAIR OF INDIVIDUAL METRICS 312

OUTPUT AN INDICATION OF THE TABULATED AND/OR AGGREGATED METRICS TO A GRAPHICAL USER INTERFACE AND/OR TARGETED APPLICATION 314

COMPARE THE TABULATED AND/OR AGGREGATED METRICS TO CORRESPONDING METRICS OF OTHER WEAK-TO-STRONG ANNOTATION ALIGNMENT ALGORITHMS AND SELECT, RECOMMEND, OR ADJUST AN ALGORITHM BASED ON THE COMPARISON 316

FIG. 5
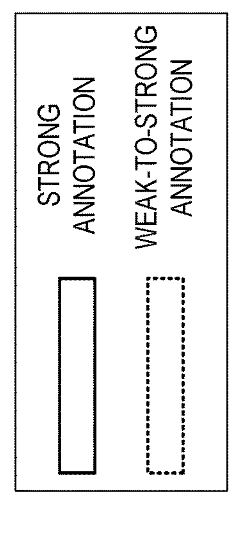
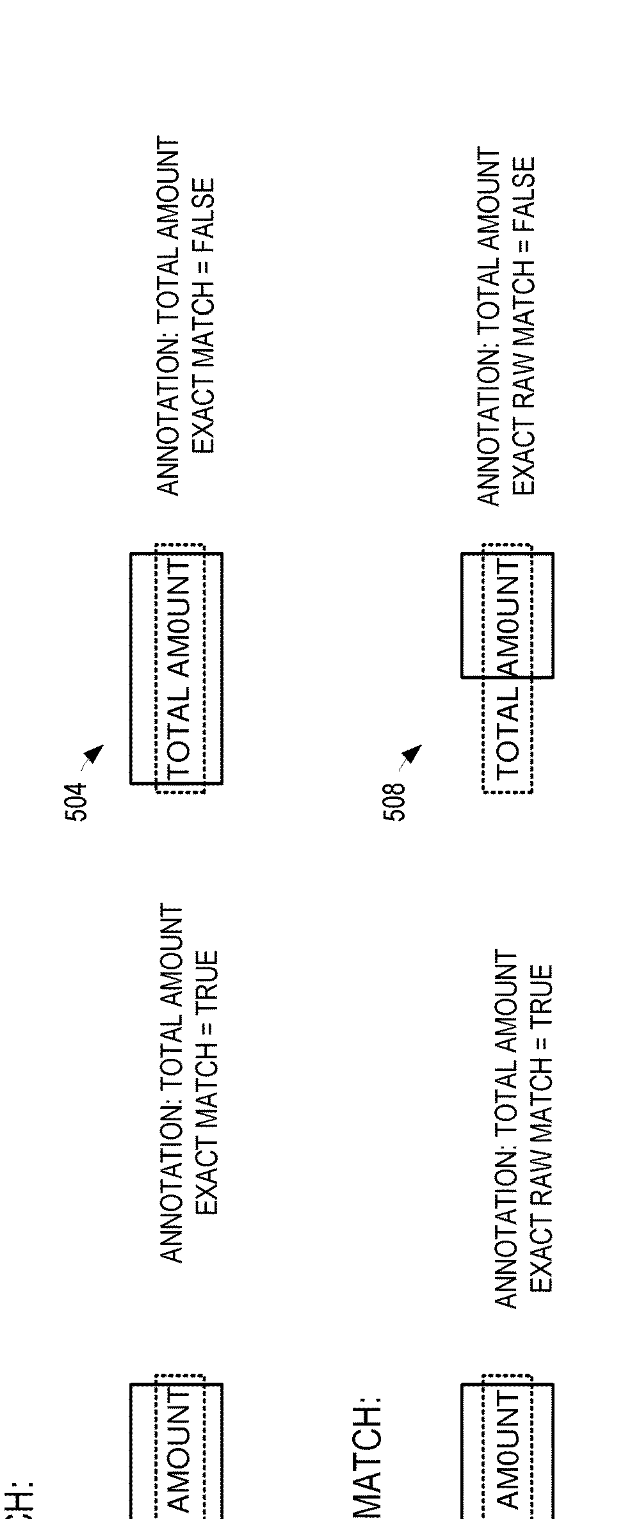
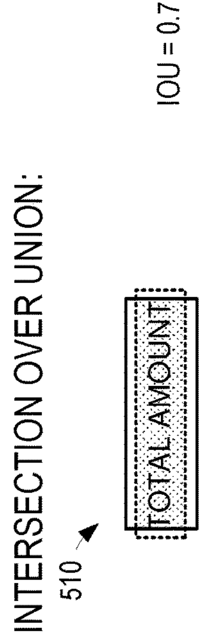

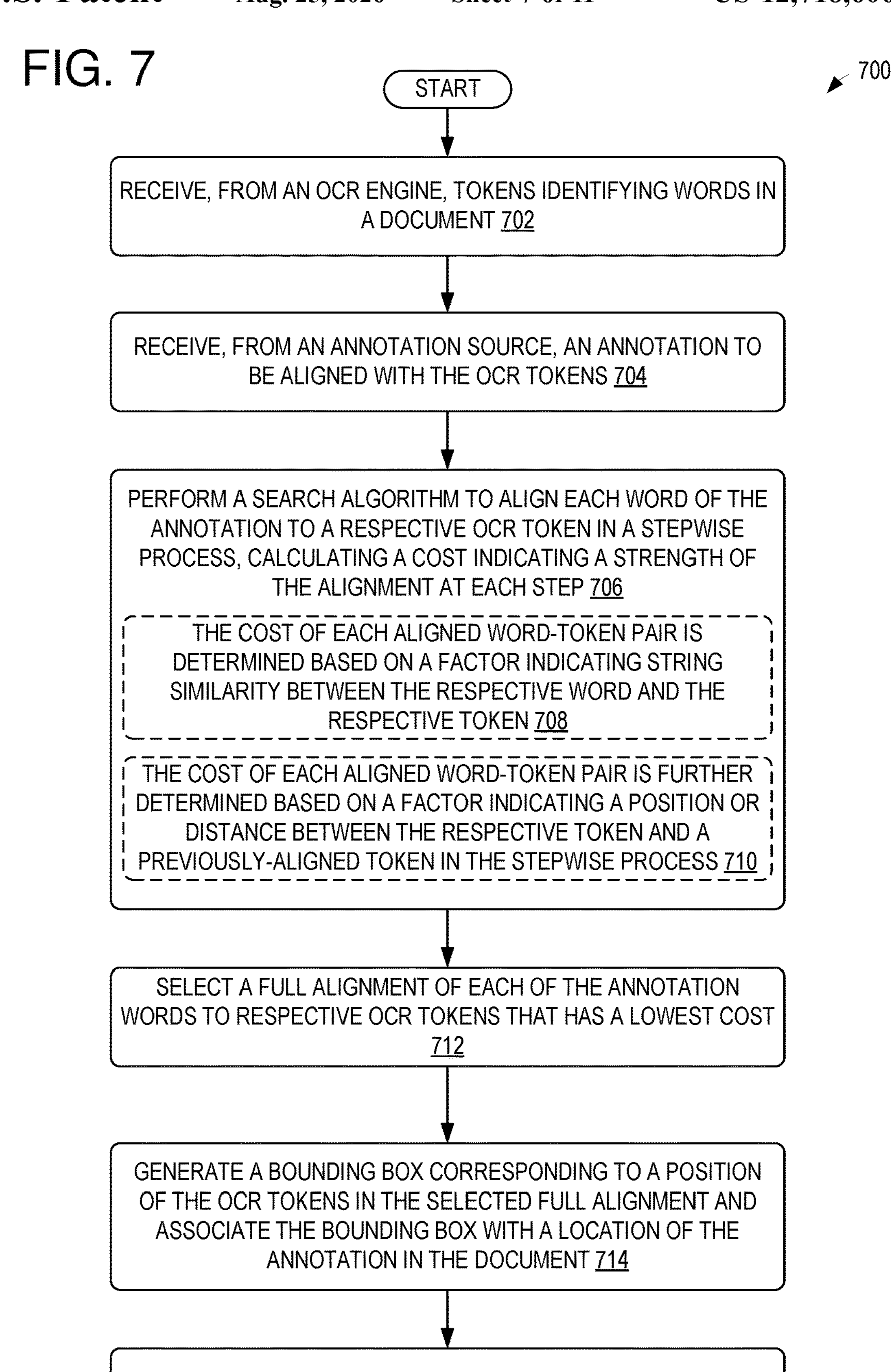

FIG. 7
700
START
RECEIVE, FROM AN OCR ENGINE, TOKENS IDENTIFYING WORDS IN A DOCUMENT 702
RECEIVE, FROM AN ANNOTATION SOURCE, AN ANNOTATION TO BE ALIGNED WITH THE OCR TOKENS 704
PERFORM A SEARCH ALGORITHM TO ALIGN EACH WORD OF THE ANNOTATION TO A RESPECTIVE OCR TOKEN IN A STEPWISE PROCESS, CALCULATING A COST INDICATING A STRENGTH OF THE ALIGNMENT AT EACH STEP 706
THE COST OF EACH ALIGNED WORD-TOKEN PAIR IS DETERMINED BASED ON A FACTOR INDICATING STRING SIMILARITY BETWEEN THE RESPECTIVE WORD AND THE RESPECTIVE TOKEN 708
THE COST OF EACH ALIGNED WORD-TOKEN PAIR IS FURTHER DETERMINED BASED ON A FACTOR INDICATING A POSITION OR DISTANCE BETWEEN THE RESPECTIVE TOKEN AND A PREVIOUSLY-ALIGNED TOKEN IN THE STEPWISE PROCESS 710
SELECT A FULL ALIGNMENT OF EACH OF THE ANNOTATION WORDS TO RESPECTIVE OCR TOKENS THAT HAS A LOWEST COST 712
GENERATE A BOUNDING BOX CORRESPONDING TO A POSITION OF THE OCR TOKENS IN THE SELECTED FULL ALIGNMENT AND ASSOCIATE THE BOUNDING BOX WITH A LOCATION OF THE ANNOTATION IN THE DOCUMENT 714
OUTPUT AN INDICATION OF THE LOCATION OF THE ANNOTATION IN THE DOCUMENT TO A TARGET APPLICATION 716

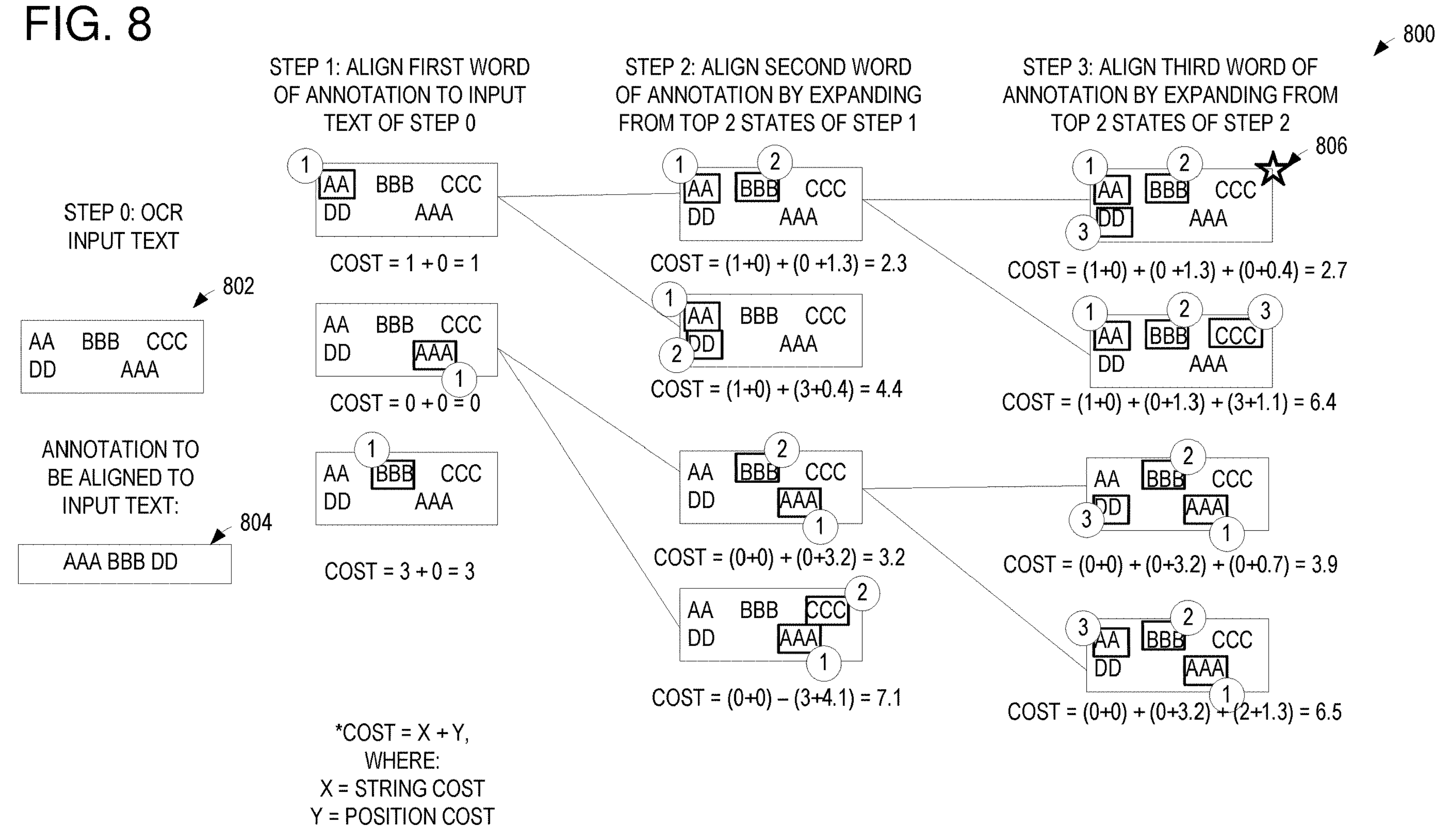
FIG. 8
800
STEP 0: OCR INPUT TEXT
802
AA BBB CCC
DD AAA
ANNOTATION TO BE ALIGNED TO INPUT TEXT:
804
AAA BBB DD
STEP 1: ALIGN FIRST WORD OF ANNOTATION TO INPUT TEXT OF STEP 0
COST = 1 + 0 = 1
COST = 0 + 0 = 0
COST = 3 + 0 = 3
*COST = X + Y, WHERE:
X = STRING COST
Y = POSITION COST
STEP 2: ALIGN SECOND WORD OF ANNOTATION BY EXPANDING FROM TOP 2 STATES OF STEP 1
COST = (1+0) + (0 +1.3) = 2.3
COST = (1+0) + (3+0.4) = 4.4
COST = (0+0) + (0+3.2) = 3.2
COST = (0+0) – (3+4.1) = 7.1
STEP 3: ALIGN THIRD WORD OF ANNOTATION BY EXPANDING FROM TOP 2 STATES OF STEP 2
806
COST = (1+0) + (0 +1.3) + (0+0.4) = 2.7
COST = (1+0) + (0+1.3) + (3+1.1) = 6.4
COST = (0+0) + (0+3.2) + (0+0.7) = 3.9
COST = (0+0) + (0+3.2) + (2+1.3) = 6.5

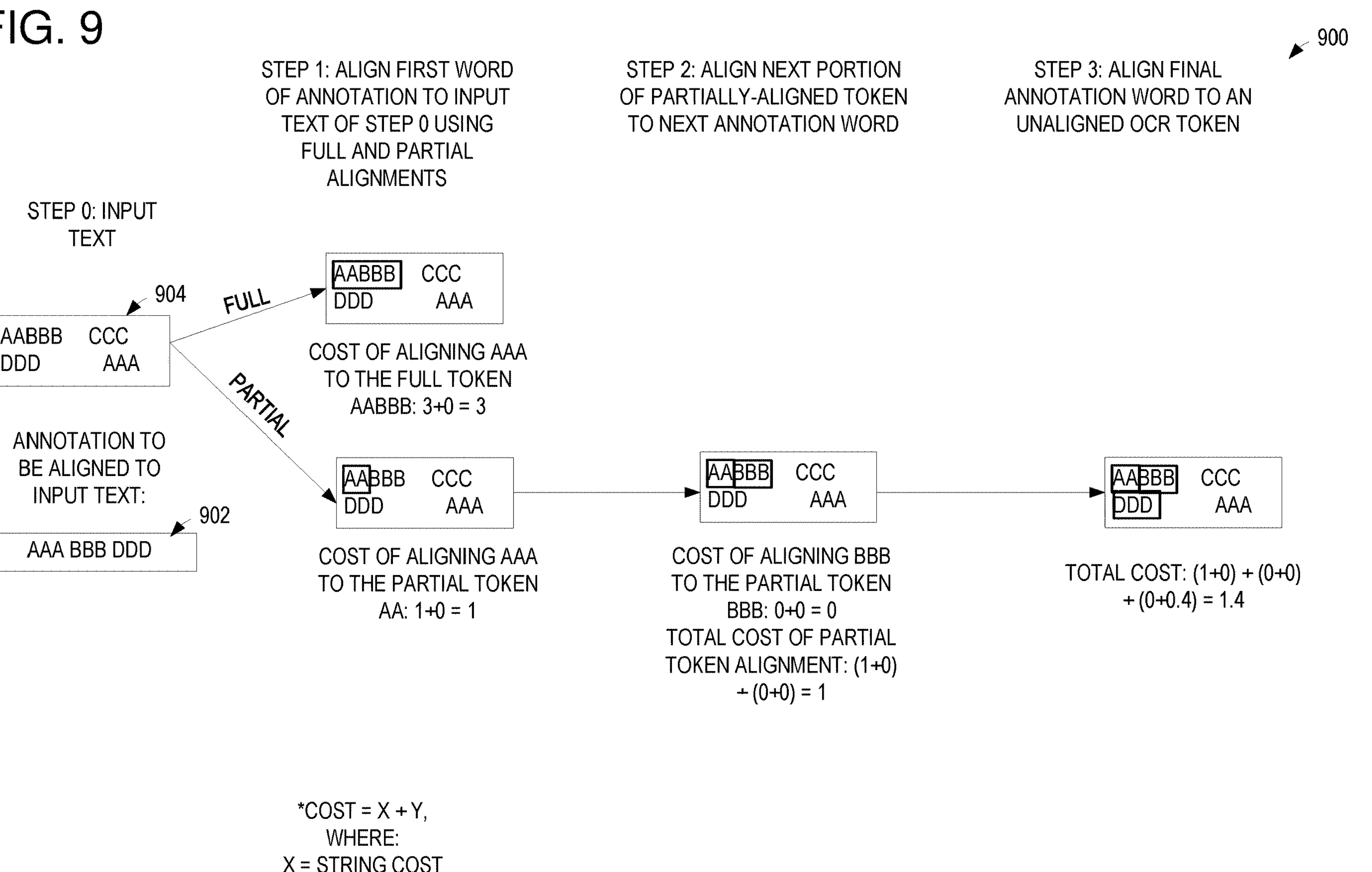
FIG. 9
900
STEP 1: ALIGN FIRST WORD OF ANNOTATION TO INPUT TEXT OF STEP 0 USING FULL AND PARTIAL ALIGNMENTS
STEP 2: ALIGN NEXT PORTION OF PARTIALLY-ALIGNED TOKEN TO NEXT ANNOTATION WORD
STEP 3: ALIGN FINAL ANNOTATION WORD TO AN UNALIGNED OCR TOKEN
STEP 0: INPUT TEXT
904
AABBB CCC
DDD AAA
FULL
PARTIAL
AABBB CCC
DDD AAA
COST OF ALIGNING AAA TO THE FULL TOKEN AABBB: 3+0 = 3
ANNOTATION TO BE ALIGNED TO INPUT TEXT:
902
AAA BBB DDD
AABBB CCC
DDD AAA
COST OF ALIGNING AAA TO THE PARTIAL TOKEN AA: 1+0 = 1
AABBB CCC
DDD AAA
COST OF ALIGNING BBB TO THE PARTIAL TOKEN BBB: 0+0 = 0
TOTAL COST OF PARTIAL TOKEN ALIGNMENT: (1+0) + (0+0) = 1
AABBB CCC
DDD AAA
TOTAL COST: (1+0) + (0+0) + (0+0.4) = 1.4
*COST = X + Y, WHERE:
X = STRING COST
Y = POSITION COST FIG. 10
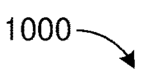
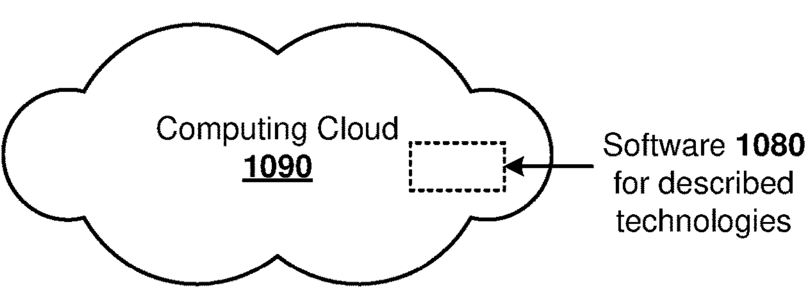
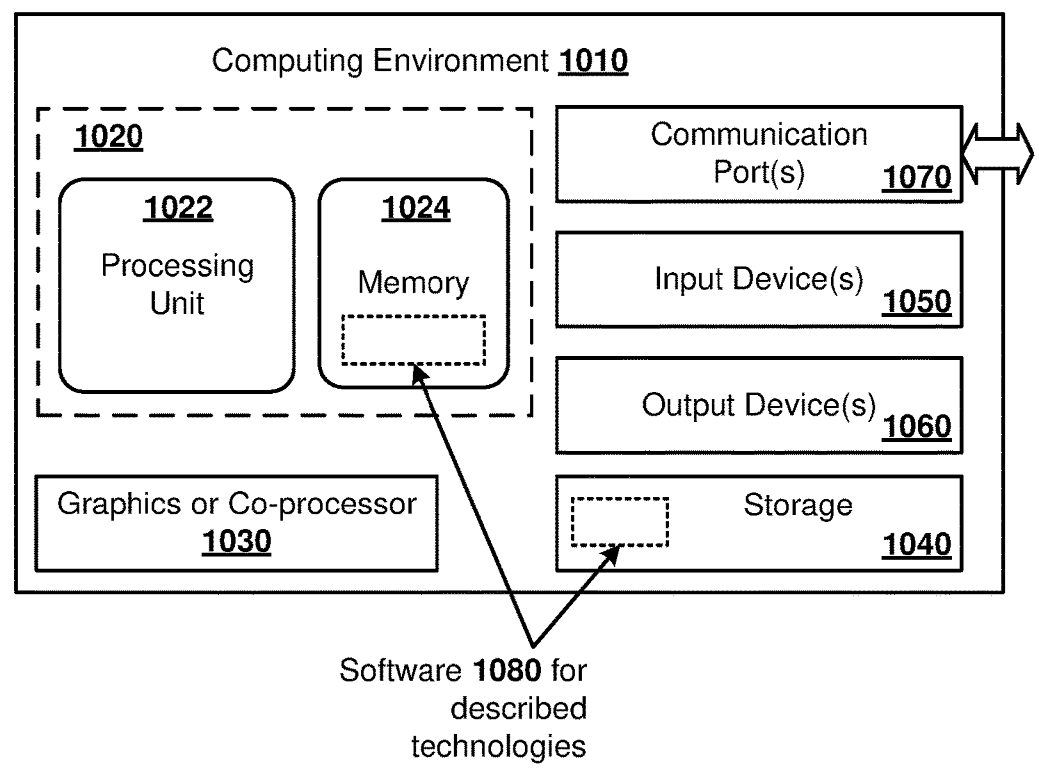

ANNOTATION ALIGNMENT ALGORITHM ANALYSIS FOR CHARACTER RECOGNITION

BACKGROUND

Optical character recognition (OCR), intelligent character recognition (ICR), and/or other content extraction mechanisms can be performed on digital documents in order to generate machine-readable representations of the content in the documents that allow for further computer processing based on and/or using the extracted content. In some machine learning models for document information extraction tasks, training labels are used, which include both the content to be extracted (e.g., an invoice number) and a bounding box localizing it on the document. Such annotations are also referred to as strong annotations. The input for such models is typically constructed from the output of an OCR engine (individual OCR tokens), which is then aligned with the label information. Using the bounding boxes of the strong annotations, this alignment can be computed by using some measure of overlap between the bounding boxes of the OCR tokens and the bounding boxes of the strong annotations.

However, applications, such as the above-described models, that use strong annotation severely limit the amount of training data that is available. Typically, the strong annotations are created by human annotators who manually generate the bounding boxes for annotated content, which is both costly and time-consuming. Data without bounding boxes for the labels, referred to as weakly annotated data, on the other hand is available in much larger quantities as this data can be extracted from Enterprise Resource Planning (ERP) systems that store the information that was extracted from business documents (in most cases by humans). However, in these contexts, the weak annotations would not include bounding boxes, as they are not relevant for ERP. Accordingly, there remains a need for improved technologies to generate bounding boxes used for strong annotations of document content, and evaluate accuracy of such generations, with reduced human interaction and resources relative to the typical strong annotation processes described above.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In summary, the detailed description is directed to various innovative technologies for evaluating algorithms for aligning annotations with character recognition tokens for a document to determine a location of the annotations in the document. In some examples, the disclosed technologies can be implemented as computer-readable media storing instructions which, when executed by one or more hardware processors, cause the hardware processors to perform the following actions. An expanded annotated data set for a document is generated, the expanded annotated data set including strong annotations of optical character recognition (OCR) labels for content in the document and weak-to-strong annotations resulting from applying a weak-to-strong annotation alignment algorithm to the labels. For each label of the OCR labels, a respective strong annotation is matched to a respective weak-to-strong annotation for the label to form a respective matched pair. Individual metrics for the strong annotations and individual metrics for the weak-to-strong annotations in the expanded annotated data set are calculated, the individual metrics including comparisons of aspects of the strong annotations to the weak-to-strong annotations for each respective matched pair. The individual metrics associated with each label of the OCR labels are aggregated to generate aggregated metrics. An indication of the aggregated metrics is output to a graphical user interface or a target application, the indication usable to determine a selection or adjustment of the weak-to-strong annotation alignment algorithm for use in generating subsequent strong annotations from weakly annotated data sets for use in Optical Character Recognition (OCR) operations.

In some examples, the disclosed technologies can be implemented as a method performed by a computer. Weak-to-strong annotations for a document that are generated by applying a weak-to-strong annotation alignment algorithm that has weak annotations for the document as an input are received, from a first source including an annotation alignment service or associated storage device. Strong annotations for the document are received, from a second source. Strong annotations from the second source are matched to weak-to-strong annotations from the first source to generate respective pairs of matched annotations. For each pair of matched annotations, respective metrics for the strong annotation of the pair and the weak-to-strong annotation of the pair are calculated, the respective metrics including one or more of: an exact match metric comparing Optical Character Recognition (OCR) text in a first bounding box of the weak-to-strong annotation of the pair to a string of the strong annotation of the pair, an exact raw match metric comparing the OCR text in the first bounding box to OCR text in a second bounding box of the strong annotation of the pair, or an intersection over union metric corresponding to an overlap of the first and second bounding boxes. The respective metrics for the pairs of matched annotations are aggregated to generate aggregated metrics. An indication of the aggregated metrics is output to a graphical user interface or a target application, the indication usable to determine a selection or adjustment of the weak-to-strong annotation alignment algorithm for use in generating subsequent strong annotations from weakly annotated data sets for use in OCR operations.

In some examples, the disclosed technologies can be implemented in a system including one or more hardware processors with coupled memory, and computer-readable media storing instructions executable by the one or more hardware processors. The instructions include first, second, third, fourth, fifth, sixth, and seventh. The first instructions, when executed, an expanded annotated data set to be generated for a document, the expanded annotated data set including strong annotations of optical character recognition (OCR) labels for content in the document, each strong annotation including a respective first bounding box and a string, and weak-to-strong annotations resulting from applying a first weak-to-strong annotation alignment algorithm to the labels, each weak-to-strong annotation including a respective second bounding box generated by the weak-to-strong annotation alignment algorithm. The second instructions, when executed, cause, for each label of the OCR labels, a respective strong annotation to be matched to a respective weak-to-strong annotation for the label to form a respective matched pair. The third instructions, when executed, cause individual metrics to be calculated for the strong annotations and for the weak-to-strong annotations in the expanded annotated data set, the individual metrics including different types of comparisons of aspects of the strong annotations to the weak annotations for each respective matched pair. The fourth instructions, when executed, cause each of the different types of the individual metrics associated with each label of the OCR labels to be aggregated to generate first aggregated metrics. The fifth instructions, when executed, cause the first, second, third, and fourth instructions to be executed again using a second weak-to-strong annotation alignment algorithm to generate second aggregated metrics. The sixth instructions, when executed, cause the first aggregated metrics to be compared to the second aggregated metrics. The seventh instructions, when executed, cause an indication of the comparison of the first aggregated metrics to the second aggregated metrics to be output to a graphical user interface or a target application, the indication usable to cause a selection or adjustment of the first or second weak-to-strong annotation alignment algorithm for use in generating subsequent strong annotations from weakly annotated data sets for use in Optical Character Recognition (OCR) operations.

The foregoing and other objects, features, and advantages of the invention will become more apparent from the following detailed description, which proceeds with reference to the accompanying figures.

BRIEF DESCRIPTION OF THE DRAWINGS

FIG. 3 is a flow chart of an example method for evaluating alignment algorithms in accordance with examples of the present disclosure.

FIG. 5 is a schematic example of calculating metrics for strong to weak-to-strong annotation pairs.

FIG. 7 is a flow chart of an example method for aligning OCR tokens with weak annotations in accordance with examples of the present disclosure.

FIG. 8 is a schematic representation of a beam first search algorithm as applied to align OCR tokens with weak annotations in accordance with examples of the present disclosure.

FIG. 9 is a schematic representation of partially aligning OCR tokens with weak annotations in accordance with examples of the present disclosure.

FIG. 10 is a diagram schematically depicting a computing environment suitable for implementation of disclosed technologies.

DETAILED DESCRIPTION

Introduction and Overview

Figure 1:
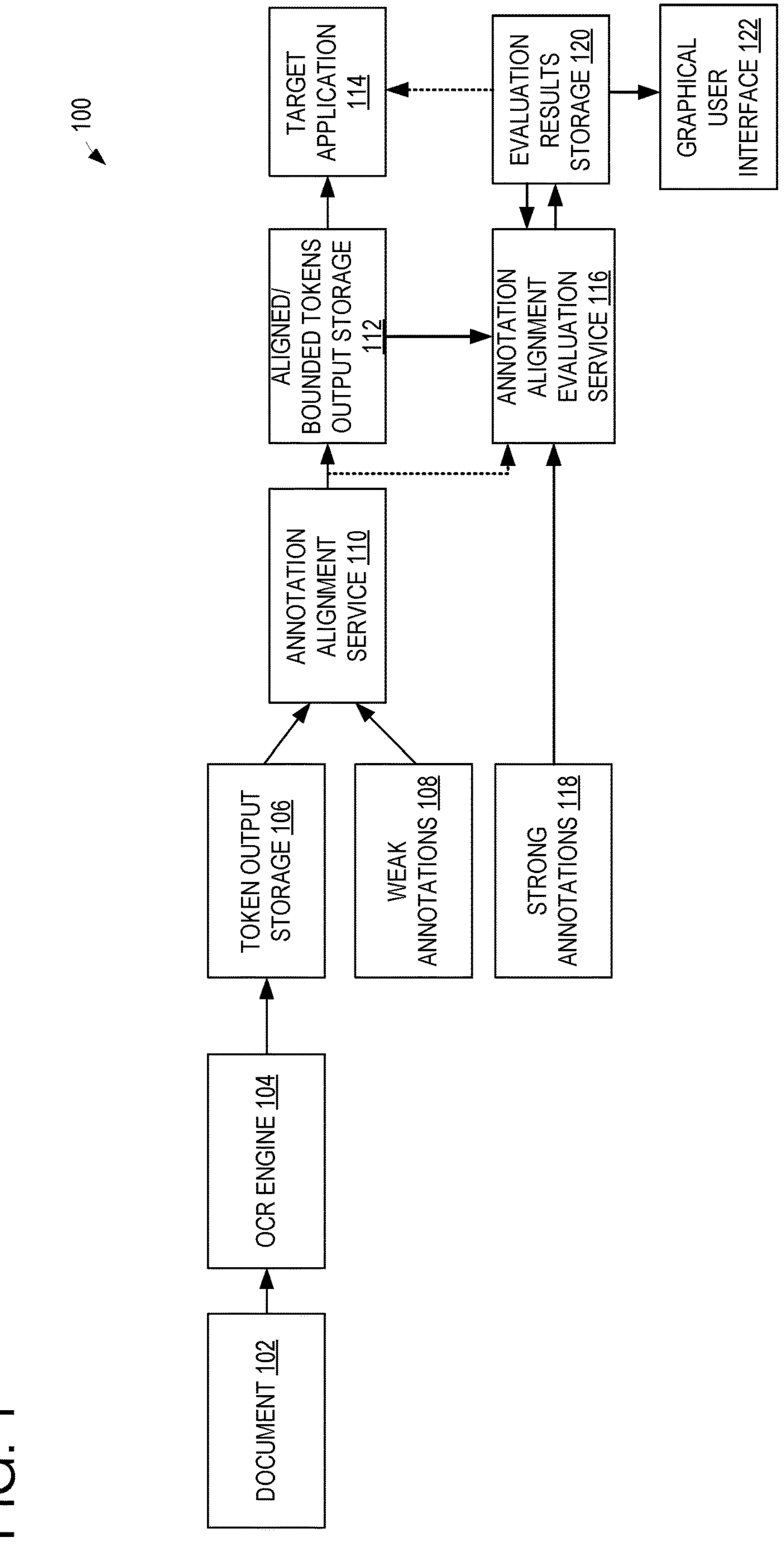
FIG. 1 is a block diagram of an example system for evaluating algorithms for aligning optical character recognition (OCR) tokens with weak annotations to generate strong annotations in accordance with examples of the present disclosure.

As described above, optical character recognition (OCR) may be used to extract content from digital documents, such as scans of physical documents, digital images of textual content, and/or other documents that include text (as used herein, the term "text" may include letters, numbers, and/or other characters). However, such recognition algorithms typically do not account for a two-dimensional layout of the document, and may return recognized characters in a line-by-line sequence and/or may return recognized text tokens (e.g., strings of one or more characters) surrounded by a bounding box. In some examples, attempting to recognize blocks of text that span portions of multiple lines in a document may be difficult without human annotations. For example, as further described above, strong annotations may be used to designate locations in a document where a targeted annotation (e.g., set of characters or words) is located in the document, however, they utilize direct human interaction to generate bounding boxes for annotation text. Further complications may also arise due to OCR errors, which may return slightly incorrect estimations of text in a document.

This disclosure describes a new approach to provide alignment of OCR tokens with weak annotation text (e.g., annotations that do not provide bounding boxes indicating a location of the text in the document) and evaluate the alignment results. The disclosed technologies enable bounding boxes for annotations to be generated around OCR tokens matching the annotations without relying upon human annotations indicating the location of the bounding boxes. For example, in accordance with the disclosed technologies, an annotation alignment service is provided for generating such bounding boxes using OCR token outputs and weak annotations. In order to make decisions about which algorithm to use and to determine the best choice of hyperparameters for it, the disclosed technologies include methods and systems for quantifying the performance of the algorithms. Weak-to-strong algorithm(s) may be run on strongly annotated data (e.g., annotated by human annotators), and the output may be compared with the strong annotations. As the algorithms can, in some examples, both produce too many and too few bounding boxes, and the metrics used in the disclosed technology capture (e.g., identify) both of these issues. As the performance of the algorithm might be affected by OCR errors, the disclosed technologies separate these effects from the algorithm's performance itself in the metrics. As there can be both multiple strong annotations and multiple weak-to-strong annotations, the disclosed technologies match strong and weak-to-strong annotations for evaluation.

The disclosed technologies may provide weak-to-strong annotations, generated based on an evaluation of weak-to-strong alignment algorithms, for use in a variety of applications, such as training models, generative models, output prediction checkers, and/or other applications that utilize annotations relating to recognized characters in documents.

Example System

FIG. 1 shows an example block diagram of a system 100 for aligning annotations with character recognition token outputs (e.g., to generate strong annotations from weak annotations) and evaluating alignment algorithms in accordance with examples of the present disclosure. In some examples, a document 102 (e.g., a digital computer file including recognizable text) is input to an optical character recognition (OCR) engine 104. It is to be understood that the OCR engine 104 may include any suitable character recognition systems (e.g., computing systems configured to execute instructions and/or otherwise perform the operations described herein) and/or algorithms, including intelligent character recognition (ICR).

The OCR engine 104 may be configured to perform one or more pre-processing operations to condition the data of the document 102 for character recognition, including but not limited to analyzing the document to classify areas as including text (e.g., based on colors in the document, such as classifying light areas as non-text and dark areas as including text), enhancing clarity/image quality by performing one or more image processing operations (e.g., skewing/de-skewing, smoothing, artifact removal, etc.). The OCR engine 104 may then execute one or more character recognition algorithms by analyzing the pre-processed document, including performing pattern matching and/or feature recognition to identify characters in the document. In some examples, the OCR engine 104 may perform post-processing operations including generating output relating to the results of the character recognition. For example, as shown in FIG. 1, the OCR engine 104 may output OCR tokens to a token output storage 106.

The token output storage 106 may include a memory or storage device configured to store OCR tokens indicating recognized characters generated by the OCR engine 104 based on the content of the document 102. The tokens may include one or more words (e.g., where the term "word" is used herein in at least some examples to refer to a group of one or more characters including numbers, symbols, letters, etc.) that are included in the document 102, where the tokens are ordered and/or have an indication of a position in the document relative to lines of the document and/or other words in the document. In some examples, the OCR tokens may include respective bounding boxes enclosing the word(s).

As shown at 108, weak annotations may be provided to indicate content of the document 102. For example, if the document is known to include an address block, the text of that address block may be provided as a weak annotation for the document. However, as described above, the weak annotation may not include a bounding box or other indication of a location of the corresponding text in the document. The weak annotations 108 may include words, similarly to the OCR tokens. An example of a weak annotation is described in more detail below with respect to FIG. 6. Weak annotations 108 may be provided from a weak annotation source, such as a user (e.g., via manual input), an automated or semi-automated annotation service (e.g., a database including information of the content of a document), and/or other sources.

As shown at 118, strong annotations may be provided to indicate content of the document 102 as well. However, in contrast to the weak annotations, the strong annotations 118 may include a bounding box or other indication of a location of the corresponding text/string of the strong annotation. Referring again to the address block example, a strong annotation may include a string identifying the text of that address block and a bounding box indicating a location in the document where the address block is located. Strong annotations 118 may be provided from a strong annotation source, such as a user (e.g., via manual input) and/or other sources.

An annotation alignment service 110 is included in the system 100 to intelligently match words of the weak annotations with the OCR tokens to identify where in the document 102 the text of the weak annotation is located. As a result, aligned and/or bounded tokens may be generated and stored at 112. The aligned and/or bounded tokens may include a representation of the aligned text of the weak annotations 108 and a bounding box corresponding to a location of the OCR tokens determined to be aligned with the weak annotations 108, thus converting the weak annotations into corresponding strong annotations without human intervention to manually generate the bounding boxes. The aligned/bounded tokens in storage 112 may be provided to a target application 114 for further processing involving the document 102. For example, the target application 114 may include a machine learning model configured to accept strong annotations for documents to train the model. In other examples, the target application 114 may include an application that uses a generative model configured to generate weak annotations and/or predictions for documents to display predictions to a user (e.g., the weak annotations 108 may be provided by the generative model and the aligned/bounded tokens output storage 112 may include bounding boxes to be used by the application to enhance the output of the generative model). In still further examples, the target application 114 may include one or more language models and the output stored at 112 may be used to check output prediction of the language models.

An annotation alignment evaluation service 116 may be configured to evaluate the accuracy of weak-to-strong annotation alignment algorithms by comparing results of the alignment (e.g., performed by the annotation alignment service 110) to the strong annotations 118 for the document. For example, as described in more detail below (e.g., with reference to FIGS. 2-5), the annotation alignment evaluation service 116 may receive the strong annotations 118 for the document 102, the weak-to-strong annotations from the aligned/bounded tokens output storage 112 (and/or directly from the annotation alignment service 110), match strong annotations with corresponding weak-to-strong annotations, and compare the matched annotations to one another. The output of the annotation alignment evaluation service may be provided to an evaluation results storage 120 (e.g., one or more storage devices), and may be used to update a graphical user interface 122 and/or other target application 114. For example, the results may be shown via the graphical user interface to inform a user of performance metrics for the annotation alignment relative to the strong annotations.

In other examples, the results of the evaluation from service 116 may be used by the target application to select or adjust an annotation alignment algorithm. For example, multiple annotation alignment algorithms may be used for the document 102 (and/or for other documents) and compared to corresponding strong annotations 118 by the annotation alignment evaluation service 116. The annotation alignment evaluation service may retrieve the results of evaluating each (or a subset) of the multiple annotation alignment algorithms from the evaluation results storage 120 and compare the performance metrics for the algorithms to determine which algorithm performs best (e.g., based on one or more of the metrics, as described in examples below). The determination may be used to generate and output a recommendation of the algorithm to be used or an aspect of the weak-to-strong annotation alignment algorithm to be adjusted (e.g., where the adjustment may be determined based on the calculated metrics), which may be presented to a user via the graphical user interface 122 and/or output to the target application 114 to control an aspect of OCR or related operations (e.g., OCR training).

Figure 2:
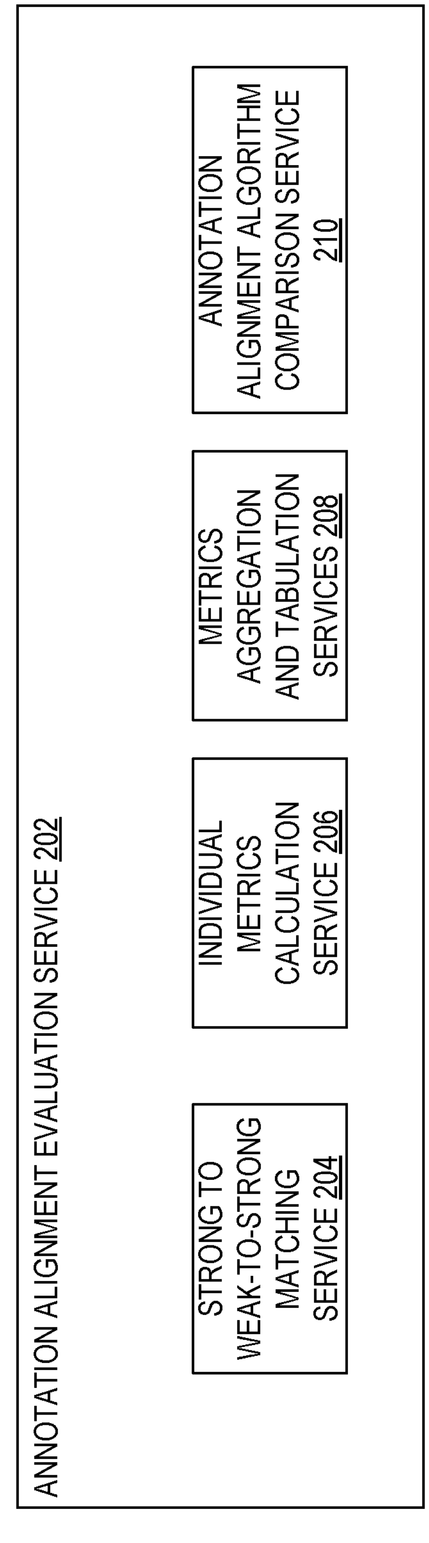
FIG. 2 is a block diagram of an example annotation alignment evaluation service in accordance with examples of the present disclosure.

FIG. 2 shows an example annotation alignment evaluation service 202. For example, the annotation alignment evaluation service 202 may include and/or be an example of annotation alignment evaluation service 116 of FIG. 1. The annotation alignment evaluation service may include computing resources (e.g., processor(s) and memory configured to store instructions executable by the processor(s)) for performing operations of services 204-210 (described in more detail below) and/or otherwise for evaluating annotation alignment algorithms.

As shown in FIG. 2, the annotation alignment evaluation service 202 may include a strong to weak-to-strong matching service 204 configured to match strong annotations for an OCR label to weak-to-strong annotations (e.g., annotations generated by applying a weak-to-strong alignment algorithm, including but not limited to any of those examples described herein, to generate strong annotations from weakly annotated data). The OCR label may include an identifier and/or key indicating a type or kind of annotation. As non-limiting examples, an OCR label may include "invoiceno" and a corresponding annotation may be "1234", or an OCR label may include "invoicedate" and a corresponding annotation may be "Sep. 4, 2023".

The annotation alignment evaluation service 202 may further include an individual metrics calculation service 206 configured to calculate individual metrics for the strong annotations and the weak-to-strong annotations for OCR labels. Examples of metrics calculations are described in more detail below with respect to FIGS. 3-5, and may include calculating an intersection over union for the annotations, an exact match determination for the annotations, and an exact raw match determination for the annotations.

The annotation alignment evaluation service 202 may further include metrics aggregation and tabulation services 208 configured to aggregate the metrics calculated by service 206 for OCR labels. Examples of aggregation and tabulation are described in more detail below with respect to FIG. 3, and may include calculating means and/or totals of the individual metrics calculated by the service 206.

The annotation alignment evaluation service 202 may further include an annotation alignment algorithm comparison service 210 configured to compare metrics calculated by services 206 and/or 208 for different weak-to-strong alignment algorithms. For example, as described above and in more detail below with respect to FIG. 3, metrics calculated based on performance of different weak-to-strong alignment algorithms may be compared to determine a best performing algorithm based on one or more of the metrics.

Example Method—Evaluating Alignment Algorithms

FIG. 3 is a flowchart of an example method 300 for evaluating an alignment of OCR tokens with weak annotations using strongly-annotated data in accordance with one or more examples of the present disclosure. For example, method 300 may be performed by one or more components of a system, such as a system 100 of FIG. 1 and/or annotation alignment evaluation service 202 of FIG. 2. In some examples, method 300 may be performed by executing instructions of an annotation alignment evaluation service and/or other components described above with respect to FIGS. 1 and 2. In some examples, the evaluation of method 300 is performed by iterating over individual pages of a strongly annotated dataset, applying the weak-to-strong annotation alignment algorithm to the labels, and then comparing the original strong annotations with the weak-to-strong annotations produced by the alignment algorithm. The calculation of the metrics for each label may be independent (e.g., performed separately for each label) and may be the same for all labels (e.g., the same types of metrics may be calculated for all labels). In other examples, different metrics may be calculated for some labels, and a comparison may be based (e.g., only or primarily) on overlapping metrics that are calculated for multiple labels.

At 302, the method includes applying (or retrieving/receiving results of applying) a weak-to-strong annotation alignment algorithm to labels of a strong annotated data set to generate an expanded annotated data set (e.g., which includes both strong annotations and weak-to-strong annotations). For example, algorithms including (but not limited to) those described herein with respect to annotation alignment service 110 of FIG. 1 and/or as described in more detail below with respect to FIGS. 6-9 may be applied to labels of a data set that is strongly annotated (e.g., includes OCR tokens with strong annotations, as described above with respect to FIG. 1). In some examples, applying the algorithms may include utilizing the annotation strings of the strong annotations as weak annotation data and performing an alignment (e.g., as described above with respect to service 110 of FIG. 1 and in more detail below with respect to FIGS. 6-9) to generate corresponding bounding boxes. Accordingly, in addition to the strong annotations, the data set may be augmented by way of the application at 302 to include weak-to-strong annotations for OCR tokens.

At 304, the method includes, for each label, matching strong annotations to weak-to-strong annotations (e.g., applied at 302) to form respective matched pairs of strong to weak-to-strong annotations. In general, for a given label, the number of strong annotations and weak-to-strong annotations can be different. The strong and weak-to-strong annotations are matched in order to be able to compare results of the weak-to-strong algorithm to the strong annotations. Example criteria for matching includes, for example, a criterion that each strong annotation can only be matched to at most one (there can be unmatched annotations) weak-to-strong annotation and vice versa, and a criterion that pairs having overlapping bounding boxes are preferentially matched with one another. In some examples, the Kuhn-Munkres algorithm (also referred to as the Hungarian algorithm/matching) may be used for matching strong annotations with weak-to-strong annotations, with the cost for each pair being given by the negative intersection over union of their bounding boxes (an example of determining intersection over union of bounding boxes is shown and described in more detail below with respect to FIG. 5). The Kuhn-Munkres algorithm finds the matching that minimizes the sum of costs over the matches between both sets (e.g., the algorithm maximizes the sum of the intersection over unions of the matched pairs). It is to be understood that other algorithm(s) may be used in addition to or instead of the Kuhn-Munkres algorithm to perform the matching.

Figure 4:
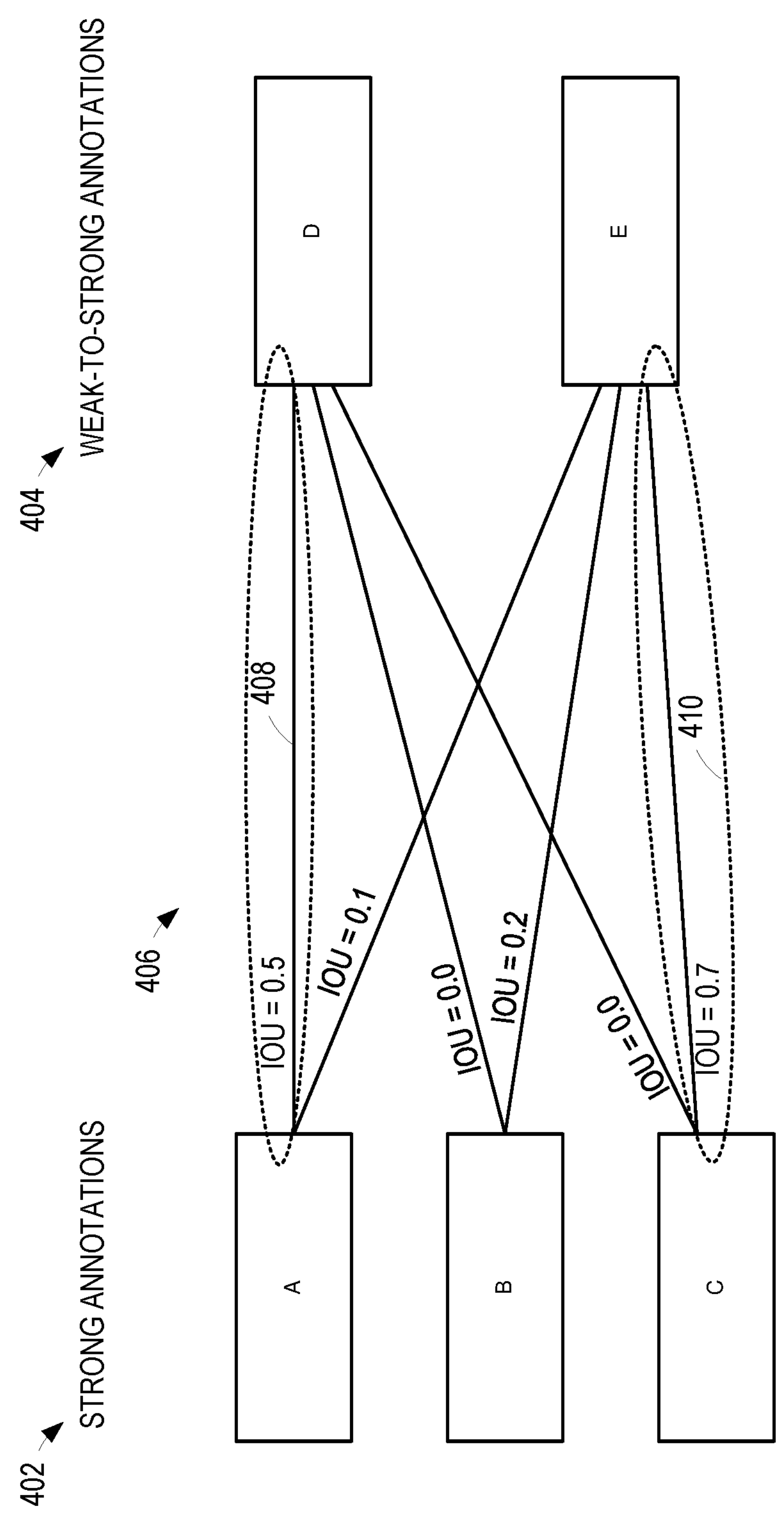
FIG. 4 is a schematic example of matching strong annotations with weak-to-strong annotations to form strong to weak-to-strong annotation pairs.

Turning briefly to FIG. 4, an example scenario for matching strong annotations with weak-to-strong annotations is shown. At 402, three strong annotations (A, B, and C) are provided for matching with two weak-to-strong annotations (D and E) at 404. As shown at 406, a respective intersection over union (IOU) of bounding boxes for each candidate pair of strong to weak-to-strong annotation (e.g., where the candidate pairs are potential matches, such as A and D, A and E, B and D, B and E, C and D, and C and E) is determined. The highest IOU for the candidate pairs including weak-to-strong annotation D (0.5 for A and D) and the highest IOU for the candidate pairs including weak-to-strong annotation E (0.7 for C and E) are identified as matching, as shown at 408 and 410 respectively. Accordingly, based on the application of the matching algorithm (e.g., the Kuhn-Munkres algorithm described above), strong annotation A is matched with strong-to-weak annotation D and strong annotation C is matched with strong-to-weak annotation E.

Returning to FIG. 3, at 306, the method includes calculating individual metrics for the strong annotations and individual metrics for the weak-to-strong annotations in the expanded data set. For example, using the scenario of FIG.

4 for non-limiting illustrative purposes, individual metrics for the strong annotations A, B, and C and for the weak-to-strong annotations D and E may be calculated. The metrics may include intersection over union, exact match, and exact raw match calculations, described in more detail below. Strong annotations and weak-to-strong annotations that are not matched (e.g., strong annotation B in the example scenario of FIG. 4) may be assigned an intersection over union of zero and a designation of "False" for both the exact match and exact raw match metrics. For example, in the scenario of FIG. 4, the individual metrics for the strong annotations may include 1) an intersection over union set comprising the intersection over union calculations for strong annotations A and C and an intersection over union calculation of zero for strong annotation B, 2) an exact match set comprising the exact match calculations for strong annotations A and C and an exact match calculation of False for strong annotation B, and/or 3) an exact raw match set comprising the exact raw match calculations for strong annotations A and C and an exact raw match calculation of False for strong annotation B. In this way, the individual metrics for strong annotations and the individual metrics for weak-to-strong annotations will be different from one another when there is at least one unmatched strong annotation and/or at least one unmatched weak-to-strong annotation.

The intersection over union metric may include an area of intersection of the two bounding boxes of the strong and weak-to-strong annotations of a given pair, divided by the area of the union of the two bounding boxes. This metric may correspond to and directly capture how well the bounding boxes of the matched annotations overlap.

The exact match metric may include a designation of either "True" or "False" (e.g., represented in any suitable manner, including via text string, integer value [e.g., 1 for True and 0 for False, as a non-limiting example], and/or other representation) for a pair of matched annotations. The exact match metric may be determined to be True for a given pair if the OCR text in the weak-to-strong annotation bounding box of the pair is exactly equal to the string in the strong annotation of the pair. Otherwise (e.g., if the OCR text in the weak-to-strong annotation bounding box is different from, or not exactly equal to, the string in the strong annotation), the metric may be determined to be False for the pair. It is to be understood that the string in the strong annotation can, in some examples, be different from the OCR text content of the strong annotations bounding box.

The exact raw match metric may include a designation of either "True" or "False" (e.g., represented in any suitable manner, including via text string, integer value [e.g., 1 for True and 0 for False, as a non-limiting example], and/or other representation, which may be the same or different than the representation used for the exact match metric described above) for a pair of matched annotations. The exact raw match metric may be determined to be true for a given pair if the OCR text content in the weak-to-strong annotation bounding box of the pair is exactly equal to the OCR text content in the strong annotation bounding box of the pair. Otherwise (e.g., if the OCR text content in the weak-to-strong annotation bounding box is different from, or not exactly equal to, the OCR text content in the strong annotation bounding box), the metric may be determined to be False for that pair. As the exact raw match utilizes the OCR text content for both evaluations, this metric is not sensitive to OCR errors.

Turning briefly to FIG. 5, example scenarios for calculating metrics for annotations of a strong to weak-to-strong annotation matched pair is shown. Example exact match metric calculations for strong and weak-to-strong annotation pairs are shown at 502 and 504. In each case, the string of the strong annotation is "TOTAL AMOUNT". In the example at 502, the OCR text content in the weak-to-strong annotation bounding box ("TOTAL AMOUNT") exactly matches the string of the strong annotation, thus the exact match metric is calculated to be True. In the example at 504, however, the OCR text content in the weak-to-strong annotation bounding box ("TOTAL AMOUNT") is not exactly the same as the strong annotation string, as it includes the number zero ["0"] in place of the letter "O" relative to the strong annotation string. Accordingly, the exact match metric for the example at 504 is calculated as being False.

Example exact raw match calculations for strong and weak-to-strong annotation pairs are shown at 506 and 508. In each case, the string of the strong annotation is "TOTAL AMOUNT." However, as the exact raw match calculations only consider OCR text, the strong annotation string is not evaluated. Accordingly, in the example at 506, since the OCR text of "TOTAL AMOUNT" in the weak-to-strong annotation bounding box matches the OCR text of "TOTAL AMOUNT" in the strong annotation bounding box, the exact raw match of the pair is calculated as True, despite the OCR error replacing the "O" with a "0." In the example at 508, however, the OCR text in the weak-to-strong annotation bounding box ("TOTAL AMOUNT") is different from the OCR text in the strong annotation bounding box ("AMOUNT"), so the exact raw match of the pair is calculated as False.

An example intersection over union (IOU) calculation for a strong and weak-to-strong annotation pair is shown at 510. In the example at 510, there is significant overlap between the bounding boxes for the strong and weak annotations, and the area of this intersection of the bounding boxes divided by the area of the union of the bounding boxes is calculated as 0.7.

Returning to FIG. 3, at 308, the method optionally includes tabulating the metrics for each label of the annotated data set. For example, after running the metric calculations for each page of a document, each label may be associated with two tables: one table with contributions from individual metrics for the strong annotations and one table with contributions from individual metrics for the weak-to-strong annotations in the expanded data set for the document. As described above, the calculation of individual metrics enables unmatched strong annotations and unmatched weak-to-strong annotations to be accounted for: the individual metrics for strong annotations calculates the recall of the weak-to-strong algorithm (e.g., identifying false negatives) by including contributions of an IOU of zero and exact match/exact raw match designations of "False" for any unmatched strong annotations, and the individual metrics for weak-to-strong annotations calculates the precision of the weak-to-strong algorithm (e.g., identifying false positives) by including contributions of an IOU of zero and exact match/exact raw match designations of "False" for any unmatched weak-to-strong annotations. Both tables may have the columns intersection over union, exact match, and exact raw match, and each row may represent the metrics for one match (e.g., there may be as many rows as there are matches for the given label and metric type in all of the pages represented by the dataset).

At 310, the method includes aggregating the metrics for each label of the annotated data set. For example, aggregated metrics may include a mean IOU for the weak-to-strong annotations of the expanded data set, a total of exact matches for the weak-to-strong annotations of the expanded data set (e.g., a number of true values for exact match metrics for the weak-to-strong annotations), a total of exact raw matches for the weak-to-strong annotations (e.g., a number of true values for exact raw match metrics for the weak-to-strong annotations), a mean IOU for the strong annotations of the expanded data set, a total of exact matches for the strong annotations of the expanded data set (e.g., a number of true values for exact match metrics for the strong annotations), and a total of exact raw matches for the strong annotations (e.g., a number of true values for exact raw match metrics for the strong annotations). As indicated at 312, the aggregation may include calculating further values, such as a respective score (e.g., an f1 score) for each pair of individual metrics. For example, the f1 scores may be calculated for a given aggregated metric as:

$$\frac{2*\text{aggregated metric(strong)}*\text{aggregated metric}(\text{weak-to-strong})}{\text{aggregated metric(strong)}+\text{aggregated metric}(\text{weak-to-strong})},$$

where the aggregated metric (strong) corresponds to a given one of the aggregated metrics (e.g., a given type or category of aggregated metric, such as a mean IOU, a total exact matches, or a total exact raw matches) for the strong annotations and the aggregated metric (weak-to-strong) corresponds to a given one of the aggregated metrics for the weak-to-strong annotations. Accordingly, the f1 scores may include an IOU score (where the given aggregated metric is the mean IOU), total exact match score (where the given aggregated metric is the total exact matches), and total exact raw match score (where the given aggregated metric is the total exact raw matches).

At 314, the method includes outputting an indication of the tabulated and/or aggregated metrics to a graphical user interface and/or targeted application (e.g., an OCR-related application). At 316, the method optionally includes comparing the tabulated and/or aggregated metrics to corresponding metrics of other weak-to-strong annotation alignment algorithms and selecting, recommending, and/or adjusting an algorithm based on the comparison. For example, the operations of 302-314 may be performed for multiple weak-to-strong algorithms to evaluate the accuracy of each algorithm and determine a best fit algorithm for the data set.

The best fit may be determined by default parameters and/or tunable parameters set by a user, entity, and/or application for which the algorithm is run. As a non-limiting example, a best fit may be determined to be an algorithm with a highest f1 score. In other examples, a best fit may consider a combination of parameters, such as an f1 score above a threshold that has a lowest number of false positives (unmatched weak-to-strong annotations) or a lowest number of false negatives (unmatched strong annotations). As an additional or alternative example, a hyperparameter search may be configured with an objective set to maximize one of the f1 scores (e.g., the f1 score for IOU, the f1 score for total exact matches, the f1 score for total exact raw matches, etc.) or a weighted average of all or a subset of the f1 scores.

A resulting recommendation and/or selection (e.g., based on one of the above example best fit determinations, or any other suitable recommendation determination) may be output (e.g., via the graphical user interface) to a user and/or provided to an application and may be usable to cause the best fit algorithm to be used to generate strong annotations from weakly annotated data sets for use in subsequent OCR operations (e.g., OCR applications and/or OCR training data/operations).

Example Scenario—Converting Weak Annotations to Strong Annotations

Figure 6:
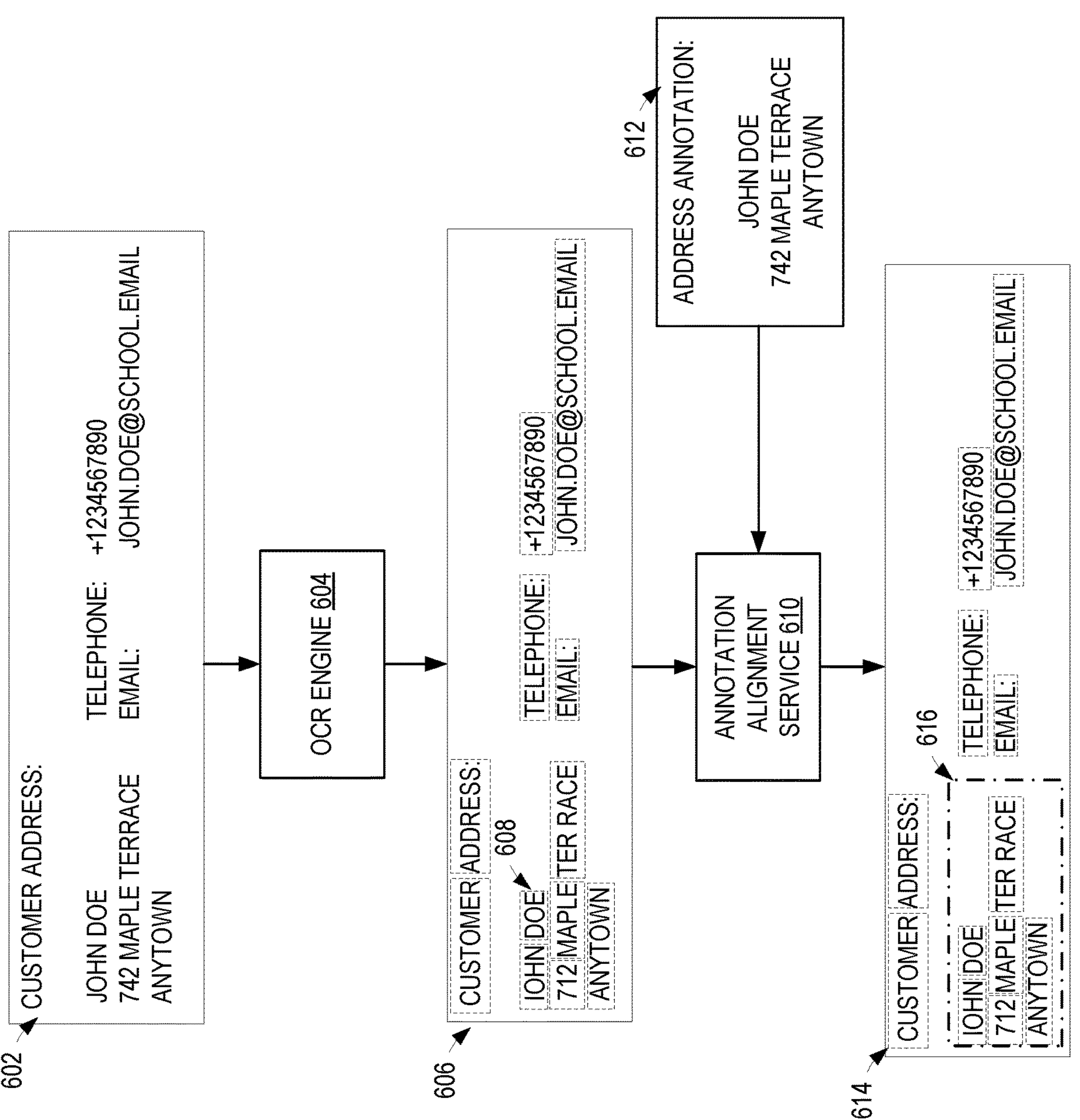
FIG. 6 is an example application of annotation alignment to a document.

FIG. 6 schematically shows how different components of an annotation alignment system, such as system 100 of FIG. 1, may be used to convert weak annotations to strong annotations for a document. For example, the operations and components shown in FIG. 6 may be used to apply the weak-to-strong annotation alignment algorithm at 302 of FIG. 3. As shown, a document 602 may be input into an OCR engine 604 (e.g., an example of OCR engine 104 of FIG. 1). The document 602 includes several different pieces of information, including an individual's name, address, phone number, and email address. The OCR engine 604 may be configured to process the document 602 and attempt to recognize the text content therein (e.g., using the algorithms and/or operations described above with respect to OCR engine 104 of FIG. 1). An example output of the OCR engine is shown at 606, including a plurality of tokens 608 corresponding to recognized words in the document. For example, the second line of the output 606 includes the tokens "IOHN" "DOE" "TELEPHONE:" and "+1234567890." Accordingly, there are some errors in the recognition (e.g., "IOHN" instead of "JOHN" etc.) relative to the input document 602. Nevertheless, as will be described in more detail below with respect to FIGS. 7 and 8, the present disclosure provides mechanisms for aligning words of an annotation with OCR tokens, even accounting for typographical errors.

The output 606 of the OCR engine 604 and a weak annotation 612 (e.g., an address, including a name and street address) are provided to an annotation alignment service 610 for processing. Annotation alignment service 610 may be an example of annotation alignment service 110 of FIG. 1 and may be configured to perform one or more of the associated operations. For example, the annotation alignment service 610 may be configured to match words of the address weak annotation 612 (e.g., "JOHN" "DOE" "742" "MAPLE" "TERRACE" "ANYTOWN") with one or more respective OCR tokens from the output 606 and determine a best match using a cost function, which will be described in more detail below with respect to FIGS. 7 and 8. As a result, the annotation alignment service 610 may generate a bounding box around the OCR tokens that are matched to the address annotation, such as bounding box 616, and provide an output 614 including the generated bounding box(es).

Example Method—Aligning OCR Tokens with Weakly Annotated Data

FIG. 7 is a flowchart of an example method 700 for aligning OCR tokens with weak annotations in accordance with one or more examples of the present disclosure. For example, method 700 may be performed by one or more components of a system, such as a system 100 of FIG. 1. In some examples, method 700 may be performed by executing instructions of an annotation alignment service and/or other components described above with respect to FIGS. 1 and 6. At 702, the method includes receiving, from an OCR engine, tokens identifying words in a document. For example, as described above with respect to FIGS. 1 and 6, an OCR engine may output OCR tokens for words identified by the character recognition algorithms and processing.

At 704, the method includes receiving, from an annotation source, an annotation to be aligned with the OCR tokens. For example, the annotation may be a weak annotation, providing a block of text (e.g., one or more words) to be aligned with corresponding OCR tokens. As described above, such OCR tokens may not be aligned in the document in the same manner as the annotation when considering the entirety of the document as processed line-by-line.

Accordingly, at 706, the method includes performing a search algorithm to align each word of the annotation to a respective OCR token in a stepwise process, calculating a cost indicating a strength of the alignment at each step. As indicated at 708, the cost of each aligned word-token pair may be determined based on a factor indicating a string similarity between the respective word and the respective token. For example, each character of the annotation word that is different than the corresponding respective OCR token word may increase the cost by a set amount (e.g., a flat cost, such as 1 point increase for each different character, an accelerating cost such that each additional character difference increases the cost by a further amount, etc.) or a variable amount (e.g., by an amount that is based on a pixel/shape/contextual difference between the different characters, for example a character difference of I vs J would be assigned a lower cost than a difference of O vs Z). As a non-limiting example, the string similarity may be a Levenshtein distance (e.g., the minimum number of single-character edits (insertions, deletions or substitutions) required to change one word into the other). As indicated at 710, the cost of each aligned word-token pair may be further determined based on a factor indicating a position or distance between the respective token and one or more other tokens, such as a last-aligned token, all previously aligned tokens, and/or a subset of previously aligned tokens. For example, the position or distance may be a Euclidean distance in the document between the respective token and the one or more other tokens, a number of spaces/tokens between the respective token and the one or more other tokens, etc. As one example, the position or distance may be calculated as the minimum distance of the current token (e.g., a fourth aligned token) to each previous aligned tokens (e.g., first, second, and third aligned tokens), as represented by the following equation: min (dist (t1,t4), dist (t2,t4), dist (t3,t4)). Additional examples of the cost determinations are described in more detail below with respect to FIG. 8.

At 712, the method includes selecting a full alignment of each of the annotation words to respective OCR tokens that has a lowest cost. For example, a full alignment may include a full set of annotation word-OCR token pairs such that each annotation word in the annotation is aligned to a corresponding respective OCR token for the document without redundancy (e.g., the full alignment includes only one OCR token alignment for each word of the annotation and each word of the annotation is associated with a respective OCR token). As there may be multiple full alignments (e.g., full alignment sets) evaluated (as explained in more detail below with respect to the example of FIG. 8), the total cost for each full alignment may be compared to one another to determine a best fit (e.g., lowest total cost) alignment.

At 714, the method includes generating a bounding box corresponding to a position of the OCR tokens in the selected full alignment and associate the bounding box with a location of the annotation in the document. For example, the bounding box may be selected to be a smallest box that encloses all of the OCR tokens aligned with annotation words in the full alignment. At 716, the method includes outputting an indication of the location of the annotation in the document to a target application. Examples of target applications and uses of the annotation (now converted to a strong annotation) are described above.

Example Beam Search Process for Aligning Annotations to OCR Tokens

FIG. 8 schematically shows an example process 800 for performing a beam search process (e.g., a best-first beam search process) to align annotations to OCR tokens. For example, the process 800 may be performed by the annotation alignment service 110 of FIG. 1 or annotation alignment service 610 of FIG. 6 to generate an alignment of OCR tokens to weak annotations. At step 0, OCR input text (e.g., OCR tokens) is shown at 802 to include the tokens "AA" "BBB" and "CCC" on a first line of a document and "DD" and "AAA" on a second line of a document. The weak annotation 804 to be aligned to the OCR tokens includes words "AAA" "BBB" and "DD."

At step 1, the first word of the annotation 804 ("AAA") is aligned to respective OCR tokens of the input text 802 and associated costs are determined including a string cost and position cost. The string cost may include factors that relate to a difference between the characters in the OCT token and the characters of the word of the annotation to which the OCT token is being aligned. In some examples, this may include a Levenshtein edit distance, which indicates how many edit operations are needed to change the current OCR word into the annotation word. The position cost may include factors that relate to a distance between the OCR token and a last or immediately-previously aligned OCR token (or all prior-aligned OCR tokens). In some examples, the position cost may be calculated as the minimum Euclidean distance between the bounding box of the current OCR token to all previously aligned OCR tokens. In some examples, one or more of the cost functions may be normalized to fall between 0 and 1 and a weighted sum of the different costs may represent the overall fitness of aligning the current OCR token to the corresponding annotation word.

In the illustrated example, "AAA" is first aligned with OCR token "AA" resulting in a cost of 1 (the sum of a string cost of 1 due to the lack of a third "A" in the OCR token and a position cost of 0; since this is the first word of the annotation, all alignment attempts will have a position cost of 0 as there is no prior-aligned word, except in examples where the position cost considers other factors, such as position in the line, position in the document, etc.). "AAA" is also aligned with the "AAA" OCR token, for a total cost of 0, and with the "BBB" OCR token for a total cost of 3 (due to the string cost of 3 resulting from the OCR token having three differing characters compared to the target weak annotation text of "AAA"). It is to be understood that additional alignments may be determined and considered as well in other examples, such as an alignment of "CCC" and "DD."

Accordingly, the cost of each alignment is compared to one another, and the alignments with the best two costs (e.g., the two lowest costs) are selected for expansion (e.g., continuing to perform alignment for a next word of the weak annotation 804). Thus in step 2, the second word of the annotation ("BBB") is aligned with respective OCR tokens, taking into account the distance from the first two alignments made for the first word of the annotation ("AAA") at step 1. As shown, this results in four new cost calculations for four next step alignment operations. As noted above, in some examples, additional cost calculations may be performed in some examples. As one such example, each of the previous alignments may be expanded to four new alignments. The first alignment of step 2 has a total cost of 2.3, which results from summing the cost of the prior alignment at step 1 with the cost of the alignment of "BBB" in the annotation with the "BBB" OCR token, where the position cost of "BBB" relative to "AA" is 1.3 reflecting the Euclidean distance between the respective bounding boxes for these two tokens. It is to be understood that the use of two lowest costs in the illustrative example is a non-limiting approach, and in other examples, the n lowest cost pairs may be used to progress to the next step, where n is an integer greater than 1. For example, annotation word-token pairs having the n lowest costs relative to each alignment performed at a given step (or a lowest-cost n number of annotation word-token pairs) may be used as alignment candidates for a next step, where the value of n, representing a beam size in the context of a beam search, may be selected by a user, set by default (e.g., based on a number of annotation words/tokens, a targeted precision, etc.), and/or selected by another process(es).

Step 3 includes performing a similar operation to step 2; selecting the top two performers cost-wise of the prior alignment selections and then expanding to align the last word of the annotation ("DD") and generating resulting costs. As shown by the star 806, the lowest cost full alignment is selected for generating a bounding box and outputting to a target application. Thus, the beam search algorithm explores multiple states at each step, and expands the states, selecting the best k (in the illustrated example, k=2) states for the next step, doing so iteratively until obtaining a target amount or number of terminal states. In some examples, an agenda is used to store all the states that will be expanded, which initially only includes the initial state where no annotation word is aligned yet. At each step, each state in the agenda is expanded by aligning the current annotation word to an OCR word that has not been aligned, and the overall cost so far is calculated, which is the overall cost of the previous state plus the incremental cost. Having gathered all the new states in a step, the states are then ranked by the cost, and the top-k ones (k is also called the beam size) are selected into the agenda for the next step. The process of expand→select is performed N times until reaching the terminal state with the minimal cost, and in this example, N is the number of words in the annotation, since at each step one annotation word is aligned.

To reduce the search space, in some examples, a heuristic is applied that not all OCR tokens are to be considered after the previous alignment (and/or after each step of alignment). For example, only the OCR tokens that are within the following x lines (e.g., where x=3 in a non-limiting example) of the last OCR token may be considered since the aligned OCR tokens are unlikely to be farther away from each other. In this way, a speed of the beam search algorithm may be increased by reducing the total number of alignments/steps performed while focusing on best (e.g., most likely and/or lowest-cost) candidates for alignment.

Example Process for Partially Aligning Annotations to OCR Tokens

FIG. 9 schematically shows an example approach to aligning annotations at a subword level to partially align OCR tokens and annotations. For example, a basic word-level alignment method might face problems when the OCR words are tokenized differently than the annotation. For example, if the annotation in FIG. 6 includes the word "TERRACE" while the OCR engine spaces it out into two words ("TER" and "RACE") because of a spacing in an image of the document, the word-level alignment would first yield a high cost for "TERRACE"↔"TER", which would vastly increase the cost for the correct alignment, and potentially miss it.

Situations like this benefit from alignment on the subword level, so that a partial annotation word could be aligned to a partial OCR word (or a partial annotation word could be aligned to a full OCR word, or a full annotation word could be aligned to a partial OCR word, etc.), which could give more accurate cost estimation and avoid missing legitimate alignments.

In order to accommodate such partial alignment, in some examples, when creating the candidates for alignment, apart from creating a new state by aligning the two complete words (as in the word-level alignment), a new state may also be created which is either (a) aligning a prefix of the OCR word to the full annotation word or (b) aligning the full OCR word to a prefix of the annotation word, depending on which word is longer.

For the state with sub-word alignment, it may be defined that expansion must complete the sub-words before starting on a new word. For example, if the OCR word is a partial alignment, then the next alignment is conducted on the remaining part of the OCR word, i.e., no other OCR words are considered. Also, it may be ensured the Euclidean distance is calculated only once for each OCR word, i.e., when an OCR word is aligned in several segments, the Euclidean distance cost is only calculated in the first time.

FIG. 9 shows an example of one scenario 900 of partial alignment, in which a full annotation word 902 is aligned to a partial OCR token of OCR output 904. For example, as shown at step 1, a full alignment of word "AAA" of the annotation to word "AABBB" of the OCR token yields a cost of 3, whereas a partial alignment to just the prefix "AA" of the "AABBB" OCR token yields a cost of 1. Continuing after the partial alignment, as noted above, the next alignment at step 2 (for the next word in the annotation, "BBB") is targeted to the remainder of the OCR token in order to resolve the token before moving on to a new OCR token. In other examples, where a portion of the annotation is aligned with a full OCR token, the next alignment may not be restricted, since the full OCR token is resolved already. The subword, or partial, alignment described in FIG. 9 may provide an additional option for alignment processes, on top of the full alignment examples described herein. For example, for each state, there may exist one full alignment and potentially one or more partial alignments, resulting in an opportunity to find an equal or better solution than performing full alignment alone.

Example Process for Using Machine Learning to Enhance Alignment

The above examples may be most successful when annotation words to be aligned are relatively unique and/or include multiple characters. However, for shorter and/or more commonly-occurring annotation words, there may be multiple token matches within a document, which may create false positives when aligning the annotation words. For example, if an annotation word is the number "2," corresponding to a quantity of product listed in an invoice such a word may be found in multiple points within a document (e.g., as a line/page number, partial address, etc.) that do not correspond to a quantity of a product. Another potential issue when aligning annotations to tokens is if an assumption is made that there is a 1:1 match of the annotation and its occurrence on the document page. For example, the supplier name of an invoice could appear multiple times on the page, and a weak annotation may have the same value only once, either to save annotation effort or because the stored value in the annotation source which is taken as ground truth annotation is single-valued. This would result in too few actual occurrences being considered, in other words, false negative matches. Both false positive and false negative annotations bring noise to model training that is based on weak-to-strong annotation conversions, misleading the model to make either false positive or false negative predictions. Therefore, in some examples, additional semantic/contextual information may be used to guide the search process.

For example, machine learning models may be leveraged to provide additional supporting information to disambiguate the semantics of the occurrences and allow many-to-many match between the annotations and the occurrences through filtering based on the model confidence. An example machine learning model encodes the context of each word as features to predict the label for the word. Using the above example of an annotation of "2" corresponding to a quantity of a product, occurrences of "2" in the column of "Quantity" of a document would receive high prediction confidence for an annotation label "lineitem.quantity", because the model has learned from the training data that the numbers under the header "Quantity" are likely to be "lineitem.quantity", in contrast to, for example, a number that follows the word "page." Accordingly, in some examples, the machine learning model that may associate words or locations in the document with a label for the annotation word.

The method is not dependent on the specific implementation of the machine learning model, provided that it can calculate a confidence score for a collection of OCR words (a possible matched occurrence of the annotation) for a given annotation's label. A straightforward implementation may involve calculating the confidence score for each word in the group concerning the label using a (token) classification model and then computing the average of these confidence scores.

An example method of implementing a machine learning process as described above to align the annotations of an example label "L" that appears n times in the document includes the following steps. First, all the annotations with the same unique strings of the label L are gathered, resulting in n' annotations (where n'≤n). For each of the n' annotations, the search-based alignment method described herein (e.g., with respect to FIGS. 1 and 6-9) is run, and at most b matched occurrences are collected (b is the beam size of the search method). An optional pre-defined threshold of the matching score can be used to pre-filter the occurrences, resulting in b' occurrences, where b'≤b. All occurrences across unique annotation strings may be gathered together (at most n×b) and sorted by the alignment score from the best match. With an initially empty candidate list, the occurrences may be sorted by the matching score and iterated over, and an occurrence may be added to the candidate list if the occurrence does not overlap (e.g., share OCR tokens) with any existing occurrences in the candidate list. This way, a non-overlapping list of occurrences with the best matching score may be obtained. The confidence score of each occurrence in the final candidates list may be calculated based on the machine learning model, and some may be filtered out based on a pre-defined confidence threshold. To avoid (potentially incorrect) low model confidence overly filtering the candidates, a minimum of n occurrences (the number of annotations for the label) may be guaranteed to be accepted, even if they don't exceed the confidence threshold. In order to seed the machine learning model, training data may be created without using the machine learning model approach described above, which is used to train the machine learning model, and then results of using the machine learning model with that seed data may be fed back in as further training data to continue improving the machine learning model iteratively in a bootstrap fashion. In some examples, previously-aligned strong annotations may be overwritten by more recently-aligned strong annotations as the machine learning model becomes more accurate through the training.

FURTHER IMPLEMENTATION EXAMPLES

In some examples, the scoring/cost function described above may take into account other metrics. For example, if it is known that the annotation word (e.g., an invoice number) is found near another targeted word in the document (e.g., "Invoice Number:"), then a Euclidean distance to that other word may be a factor in the cost function. In other examples, selection of OCR tokens for aligning to an annotation word may be performed using a knowledge of a template/layout of the document, such that OCR tokens in a vicinity of a target region of the document associated with the content of the annotation word (e.g., address fields are typically in an upper left or upper right of the document, etc.) are scored lower (e.g., have a lower cost) than OCR tokens outside of the target region (or otherwise as a function of distance to the target region). Accordingly, in some examples, a cost may be based, at least in part, on a distance of a token in an annotation word-token pair to a target word or region in the document.

In some examples, a distance between OCR tokens may be precomputed or, once computed while performing a beam search algorithm, the distance may be stored/cached to avoid recalculating it in future executions. Similar caching/precomputing may be performed for string similarities in order to provide even further computing resource cost/time delay reductions.

Example Advantages

This solution is superior in comparison of approaches in the past with regards to at least the following considerations. The disclosed approach considers various metrics of weak-to-strong algorithms to capture performance measurements from multiple perspectives, including considerations of OCR errors (e.g., as described above with respect to the exact match and exact raw match metrics). Generally, the solution described herein increases the accuracy of obtaining strong annotations from character recognition processes by identifying performance characteristics of different weak-to-strong algorithms, and expands applicability of weakly annotated data by increasing the accuracy of automatically generating such strong annotations (e.g., bounding boxes) for such weak annotations without human annotation efforts.

Additional Examples

A first example of the disclosed technologies includes one or more computer-readable media storing instructions which, when executed by one or more hardware processors, cause the hardware processors to perform actions comprising: generating an expanded annotated data set for a document, the expanded annotated data set including strong annotations of optical character recognition (OCR) labels for content in the document and weak-to-strong annotations resulting from applying a weak-to-strong annotation alignment algorithm to the labels, for each label of the OCR labels, matching a respective strong annotation to a respective weak-to-strong annotation for the label to form a respective matched pair, calculating individual metrics for the strong annotations and individual metrics for the weak-to-strong annotations in the expanded annotated data set, the individual metrics including comparisons of aspects of the strong annotations to the weak-to-strong annotations for each respective matched pair, aggregating the individual metrics associated with each label of the OCR labels to generate aggregated metrics, and outputting an indication of the aggregated metrics to a graphical user interface or a target application, the indication usable to determine a selection or adjustment of the weak-to-strong annotation alignment algorithm for use in generating subsequent strong annotations from weakly annotated data sets for use in Optical Character Recognition (OCR) operations.

A second example includes the first example and further includes the one or more computer-readable media, wherein matching the respective strong annotation to the respective weak-to-strong annotation includes applying a criterion that each strong annotation of the expanded annotated data set is only matched to at most one weak-to-strong annotation of the expanded annotated data set and vice versa.

A third example includes one or both of the first example and the second example, and further includes the one or more computer-readable media, wherein matching the respective strong annotation to the respective weak-to-strong annotation includes applying an algorithm to candidate strong annotation and weak-to-strong annotation pairs for the label to find a matching that maximizes a sum of intersection over union calculations for bounding boxes of the candidate strong annotation and weak-to-strong annotation pairs.

A fourth example includes one or more of the first through third examples, and further includes the one or more computer-readable media, wherein the individual metrics include an intersection over union metric calculated as an area of intersection of bounding boxes of the respective strong annotation and the respective weak-to-strong annotation divided by an area of a union of the bounding boxes of the respective strong annotation and the respective weak-to-strong annotation.

A fifth example includes one or more of the first through fourth examples, and further includes the one or more computer-readable media, wherein the individual metrics include one or both of an exact match metric and an exact raw match metric, wherein the exact match metric is determined to be true when OCR text in a bounding box of the respective weak-to-strong annotation is exactly equal to a string of the respective strong annotation, and wherein the exact raw match metric is determined to be true when the OCR text in the bounding box of the respective weak-to-strong annotation is exactly equal to OCR text in a bounding box of the respective strong annotation.

A sixth example includes one or more of the first through fifth examples, and further includes the one or more computer-readable media, wherein the actions further comprise tabulating the aggregated metrics to form two tables of metrics for each label of the OCR labels, the two tables for each label including a first table with metrics corresponding to weak-to-strong annotations for the label and a second table with metrics corresponding to strong annotations for the label.

A seventh example includes one or more of the first through sixth examples, and further includes the one or more computer-readable media, wherein the aggregated metrics include a respective first aggregated metric for the strong annotations of the expanded annotated data set and a respective second aggregated metric for the weak-to-strong annotations of the expanded annotated data set for at least one of the individual metrics.

An eighth example includes one or more of the first through seventh examples, and further includes the one or more computer-readable media, wherein the first aggregated metric includes a first mean intersection over union calculation for the strong annotations of the expanded annotated data set and wherein the second aggregated metric includes a second mean intersection over union calculation for the weak-to-strong annotations of the expanded annotated data set.

A ninth example includes one or more of the first through eighth examples, and further includes the one or more computer-readable media, wherein the first aggregated metric includes a first total of exact matches determined for the strong annotations of the expanded annotated data set and wherein the second aggregated metric includes a second total of exact matches determined for the weak-to-strong annotations of the expanded annotated data set.

A tenth example includes one or more of the first through ninth examples, and further includes the one or more computer-readable media, wherein the first aggregated metric includes a first total of exact raw matches determined for the strong annotations of the expanded annotated data set and wherein the second aggregated metric includes a second total of exact raw matches determined for the weak-to-strong annotations of the expanded annotated data set.

An eleventh example includes one or more of the first through tenth examples, and further includes the one or more computer-readable media, wherein aggregating the individual metrics further comprises calculating a respective score based on the first aggregated metric and the second aggregated metric.

A twelfth example includes one or more of the first through tenth examples, and further includes the one or more computer-readable media, wherein the weak-to-strong annotation alignment algorithm is a first weak-to-strong annotation alignment algorithm, and wherein the actions further comprise performing a comparison of the aggregated metrics to corresponding metrics of at least one other weak-to-strong annotation alignment algorithm and selecting, recommending, or adjusting one or more of the first weak-to-strong annotation alignment algorithm or the at least one other weak-to-strong annotation alignment algorithm based on the comparison.

A thirteenth example of the disclosed technologies includes a method performed by a computer, the method comprising: receiving, from a first source including an annotation alignment service or associated storage device, weak-to-strong annotations for a document that are generated by applying a weak-to-strong annotation alignment algorithm that has weak annotations for the document as an input, receiving, from a second source, strong annotations for the document, matching strong annotations from the second source to weak-to-strong annotations from the first source to generate respective pairs of matched annotations, for each pair of matched annotations, calculating respective metrics for the strong annotation of the pair and the weak-to-strong annotation of the pair, the respective metrics including one or more of: an exact match metric comparing Optical Character Recognition (OCR) text in a first bounding box of the weak-to-strong annotation of the pair to a string of the strong annotation of the pair, an exact raw match metric comparing the OCR text in the first bounding box to OCR text in a second bounding box of the strong annotation of the pair, or an intersection over union metric corresponding to an overlap of the first and second bounding boxes, aggregating the respective metrics for the pairs of matched annotations to generate aggregated metrics, and outputting an indication of the aggregated metrics to a graphical user interface or a target application, the indication usable to determine a selection or adjustment of the weak-to-strong annotation alignment algorithm for use in generating subsequent strong annotations from weakly annotated data sets for use in OCR operations.

A fourteenth example includes the thirteenth example, and further comprises calculating a score for a first metric of the respective metrics using aggregated metrics that correspond to the first metric, wherein the score is calculated by: determining a first product of an aggregation of the first metric for the strong annotations multiplied by an aggregation of the first metric for the weak-to-strong annotations, determining a second product of the first product multiplied by two, and dividing the second product by a sum of the first metric for the strong annotations and an aggregation of the first metric for the weak-to-strong annotations.

A fifteenth example includes one or both of the thirteenth example and the fourteenth example, and further comprises the method, wherein aggregating the respective metrics comprises determining, for the strong annotations and the weak-to-strong annotations, respectively, one or more of: a total number of exact matches, a total number of exact raw matches, or a mean intersection over union value using the respective metrics calculated for each pair of matched annotations.

A sixteenth example includes one or more of the thirteenth through fifteenth examples, and further includes the method, wherein the weak-to-strong annotation alignment algorithm is a first weak-to-strong annotation alignment algorithm, and wherein the method further comprises performing a comparison of the aggregated metrics to corresponding aggregated metrics of at least one other weak-to-strong annotation alignment algorithm and selecting, recommending, or adjusting one or more of the first weak-to-strong annotation alignment algorithm or the at least one other weak-to-strong annotation alignment algorithm based on the comparison.

A seventeenth example of the disclosed technologies includes a system, comprising: one or more hardware processors with memory coupled thereto, computer-readable media storing instructions executable by the one or more hardware processors, the instructions comprising: first instructions to generate an expanded annotated data set for a document, the expanded annotated data set including strong annotations of optical character recognition (OCR) labels for content in the document, each strong annotation including a respective first bounding box and a string, and weak-to-strong annotations resulting from applying a first weak-to-strong annotation alignment algorithm to the labels, each weak-to-strong annotation including a respective second bounding box generated by the weak-to-strong annotation alignment algorithm, second instructions to, for each label of the OCR labels, match a respective strong annotation to a respective weak-to-strong annotation for the label to form a respective matched pair, third instructions to calculate individual metrics for the strong annotations and for the weak-to-strong annotations in the expanded annotated data set, the individual metrics including different types of comparisons of aspects of the strong annotations to the weak annotations for each respective matched pair, fourth instructions to aggregate each of the different types of the individual metrics associated with each label of the OCR labels to generate first aggregated metrics, fifth instructions to execute the first, second, third, and fourth instructions again using a second weak-to-strong annotation alignment algorithm to generate second aggregated metrics, sixth instructions to compare the first aggregated metrics to the second aggregated metrics, and seventh instructions to output an indication of the comparison of the first aggregated metrics to the second aggregated metrics to a graphical user interface or a target application, the indication usable to cause a selection or adjustment of the first or second weak-to-strong annotation alignment algorithm for use in generating subsequent strong annotations from weakly annotated data sets for use in Optical Character Recognition (OCR) operations.

An eighteenth example includes the seventeenth example, and further includes the system, wherein the individual metrics include an intersection over union metric calculated as an area of intersection of the first bounding box of the respective strong annotation and the second bounding box of the respective weak-to-strong annotation divided by an area of a union of the first bounding box of the respective strong annotation and the second bounding box of the respective weak-to-strong annotation.

A nineteenth example includes one or both of the seventeenth and the eighteenth examples, and further includes the system, wherein the individual metrics include one or both of an exact match metric and an exact raw match metric, wherein the exact match metric is determined to be true when OCR text in the second bounding box of the respective weak-to-strong annotation is exactly equal to the string of the respective strong annotation, and wherein the exact raw match metric is determined to be true when the OCR text in the second bounding box of the respective weak-to-strong annotation is exactly equal to OCR text in the first bounding box of the respective strong annotation.

A twentieth example includes one or more of the seventeenth through the nineteenth examples, and further includes the system, wherein the first aggregated metrics include one or more scores, wherein each score of the one or more scores is calculated based on respective aggregated metrics for a corresponding one of the different types of individual metrics.

A Generalized Computer Environment

FIG. 10 illustrates a generalized example of a suitable computing system 1000 in which described examples, techniques, and technologies, including performing search algorithms to align annotations to character recognition tokens and evaluating the performance of such algorithms according to disclosed technologies can be implemented. For example, the computing system 1000 and/or one or more elements of the computing system 1000 may include and/or be included within one or more of the described components of system 100 of FIG. 1 and/or be used to perform operations described in correspondence to FIGS. 2-9. The computing system 1000 is not intended to suggest any limitation as to scope of use or functionality of the present disclosure, as the innovations can be implemented in diverse general-purpose or special-purpose computing systems.

With reference to FIG. 10, computing environment 1010 includes one or more processing units 1022 and memory 1024. In FIG. 10, this basic configuration 1020 is included within a dashed line. Processing unit 1022 executes computer-executable instructions, such as for implementing any of the methods or objects described herein for performing annotation word-to-token alignment, or various other architectures, components, handlers, managers, modules, or services described herein. Processing unit 1022 can be a general-purpose central processing unit (CPU), a processor in an application-specific integrated circuit (ASIC), or any other type of processor. In a multi-processing system, multiple processing units execute computer-executable instructions to increase processing power. Computing environment 1010 can also include a graphics processing unit or co-processing unit 1030. Tangible memory 1024 can be volatile memory (e.g., registers, cache, or RAM), non-volatile memory (e.g., ROM, EEPROM, or flash memory), or some combination thereof, accessible by processing units 1022, 1030. The memory 1024 stores software 1080 implementing one or more innovations described herein, in the form of computer-executable instructions suitable for execution by the processing unit(s) 1022, 1030. The memory 1024 can also store footprint calculation data, a composite graph data structure, including nodes, edges, and their respective attributes; a table or other data structure indicating states of a modeled system, configuration data, UI displays, browser code, data structures including data tables, working tables, change logs, output structures, input fields, output fields, data values, indices, or flags, as well as other operational data.

A computing system 1010 can have additional features, such as one or more of storage 1040, input devices 1050, output devices 1060, or communication ports 1070. An interconnection mechanism (not shown) such as a bus, controller, or network interconnects the components of the computing environment 1010. Typically, operating system software (not shown) provides an operating environment for other software executing in the computing environment 1010, and coordinates activities of the components of the computing environment 1010.

The tangible storage 1040 can be removable or non-removable, and includes magnetic disks, magnetic tapes or cassettes, CD-ROMs, DVDs, or any other medium which can be used to store information in a non-transitory way and which can be accessed within the computing environment 1010. The storage 1040 stores instructions of the software 1080 (including instructions and/or data) implementing one or more innovations described herein.

The input device(s) 1050 can be a mechanical, touch-sensing, or proximity-sensing input device such as a keyboard, mouse, pen, touchscreen, trackball, a voice input device, a scanning device, or another device that provides input to the computing environment 1010. The output device(s) 1060 can be a display, printer, speaker, optical disk writer, or another device that provides output from the computing environment 1010.

The communication port(s) 1070 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1000 can also include a computing cloud 1090 in which instructions implementing all or a portion of the disclosed technology are executed. Any combination of memory 1024, storage 1040, and computing cloud 1090 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 11:
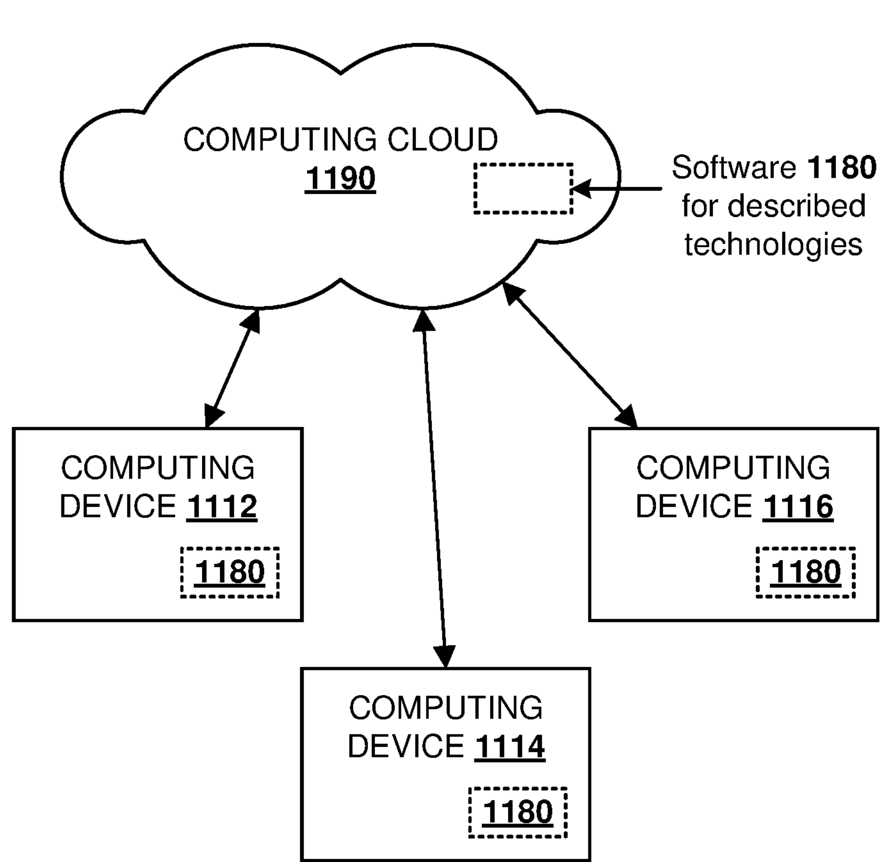
FIG. 11 is a diagram schematically depicting computing devices operating in conjunction with a computing cloud for implementation of disclosed technologies.

FIG. 11 depicts an example cloud computing environment 1100 in which the described technologies can be implemented. For example, the computing environment 1100 and/or one or more elements of the computing environment 1100 may include and/or be included within one or more of the described components of system 100 of FIG. 1 and/or be used to perform operations described in correspondence to FIGS. 2-9. The cloud computing environment 1100 comprises a computing cloud 1190 containing resources and providing services. The computing cloud 1190 can comprise various types of cloud computing resources, such as computer servers, data storage repositories, networking resources, and so forth. The computing cloud 1190 can be centrally located (e.g., provided by a data center of a business or organization) or distributed (e.g., provided by various computing resources located at different locations, such as different data centers and/or located in different cities or countries).

The computing cloud 1190 can be operatively connected to various types of computing devices (e.g., client computing devices), such as computing devices 1112, 1114, and 1116, and can provide a range of computing services thereto. One or more of computing devices 1112, 1114, and 1116 can be computers (e.g., servers, virtual machines, embedded systems, desktop, or laptop computers), mobile devices (e.g., tablet computers, smartphones, or wearable appliances), or other types of computing devices. Communication links between computing cloud 1190 and computing devices 1112, 1114, and 1116 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 1112, 1114, and 1116 can also be connected to each other.

Computing devices 1112, 1114, and 1116 can utilize the computing cloud 1190 to obtain computing services and perform computing operations (e.g., data processing, data storage, and the like). Particularly, software 1180 for performing the described innovative technologies can be resident or executed in the computing cloud 1190, in computing devices 1112, 1114, and 1116, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 10, computer-readable storage media include memory 1024, and storage 1040. The term computer-readable storage media does not include signals and carrier waves. In addition, the term computer-readable storage media does not include communication ports (e.g., 1070) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, Angular, C, C++, C #, Curl, Dart, Fortran, Go, Java, JavaScript, Julia, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more non-transitory computer-readable media storing instructions which, when executed by one or more hardware processors, cause the hardware processors to perform actions comprising:

generating an expanded annotated data set for a document, the expanded annotated data set including strong annotations of optical character recognition (OCR) labels for content in the document and weak-to-strong annotations resulting from applying a weak-to-strong annotation alignment algorithm to the labels, wherein the strong annotations include a respective first bounding box and a respective string, and wherein the weak-to-strong annotations include a respective second bounding box generated by the weak-to-strong annotation alignment algorithm;

for each label of the OCR labels, matching a respective strong annotation to a respective weak-to-strong annotation for the label to form a respective matched pair;

calculating individual metrics for the strong annotations and individual metrics for the weak-to-strong annotations in the expanded annotated data set, the individual metrics including comparisons of aspects of the strong annotations to the weak-to-strong annotations for each respective matched pair, the comparisons including comparisons of at least one of (i) overlap between the respective first bounding box of the strong annotation in the respective matched pair and the respective second bounding box of the weak-to-strong annotation in the respective matched pair or (ii) OCR text associated with the respective second bounding box of the weak-to-strong annotation in the respective matched pair to the respective string of the strong annotation of the respective matched pair;

aggregating the individual metrics associated with each label of the OCR labels to generate aggregated metrics; and outputting an indication of the aggregated metrics to a graphical user interface or a target application, the indication usable to determine a selection or adjustment of the weak-to-strong annotation alignment algorithm for use in generating subsequent strong annotations from weakly annotated data sets for use in Optical Character Recognition (OCR) operations and to cause the determined selection or adjustment of the weak-to-strong annotation alignment algorithm to be used in generating subsequent strong annotations.

2. The one or more non-transitory computer-readable media of claim 1, wherein matching the respective strong annotation to the respective weak-to-strong annotation includes applying a criterion that each strong annotation of the expanded annotated data set is only matched to at most one weak-to-strong annotation of the expanded annotated data set and vice versa.

3. The one or more non-transitory computer-readable media of claim 1, wherein matching the respective strong annotation to the respective weak-to-strong annotation includes applying an algorithm to candidate strong annotation and weak-to-strong annotation pairs for the label to find a matching that maximizes a sum of intersection over union calculations for the respective first and second bounding boxes of the candidate strong annotation and weak-to-strong annotation pairs.

4. The one or more non-transitory computer-readable media of claim 1, wherein the individual metrics include an intersection over union metric calculated as an area of intersection of the respective first and second bounding boxes of the respective strong annotation and the respective weak-to-strong annotation divided by an area of a union of the respective first and second bounding boxes of the respective strong annotation and the respective weak-to-strong annotation.

5. The one or more non-transitory computer-readable media of claim 1, wherein the individual metrics include one or both of an exact match metric and an exact raw match metric, wherein the exact match metric is determined to be true when, for a respective matched pair, the OCR text in the respective second bounding box of the respective weak-to-strong annotation is exactly equal to the respective string of the respective strong annotation, and wherein the exact raw match metric is determined to be true when the OCR text in the respective second bounding box of the respective weak-to-strong annotation is exactly equal to OCR text in the respective first bounding box of the respective strong annotation.

6. The one or more non-transitory computer-readable media of claim 1, wherein the actions further comprise tabulating the aggregated metrics to form two tables of metrics for each label of the OCR labels, the two tables for each label including a first table with metrics corresponding to weak-to-strong annotations for the label and a second table with metrics corresponding to strong annotations for the label.

7. The one or more non-transitory computer-readable media of claim 1, wherein the aggregated metrics include a respective first aggregated metric for the strong annotations of the expanded annotated data set and a respective second aggregated metric for the weak-to-strong annotations of the expanded annotated data set for at least one of the individual metrics.

8. The one or more non-transitory computer-readable media of claim 7, wherein the first aggregated metric includes a first mean intersection over union calculation for the strong annotations of the expanded annotated data set and wherein the second aggregated metric includes a second mean intersection over union calculation for the weak-to-strong annotations of the expanded annotated data set.

9. The one or more non-transitory computer-readable media of claim 7, wherein the first aggregated metric includes a first total of exact matches determined for the strong annotations of the expanded annotated data set and wherein the second aggregated metric includes a second total of exact matches determined for the weak-to-strong annotations of the expanded annotated data set.

10. The one or more non-transitory computer-readable media of claim 7, wherein the first aggregated metric includes a first total of exact raw matches determined for the strong annotations of the expanded annotated data set and wherein the second aggregated metric includes a second total of exact raw matches determined for the weak-to-strong annotations of the expanded annotated data set.

11. The one or more non-transitory computer-readable media of claim 7, wherein aggregating the individual metrics further comprises calculating a respective score based on the first aggregated metric and the second aggregated metric.

12. The one or more non-transitory computer-readable media of claim 1, wherein the weak-to-strong annotation alignment algorithm is a first weak-to-strong annotation alignment algorithm, and wherein the actions further comprise performing a comparison of the aggregated metrics to corresponding metrics of at least one other weak-to-strong annotation alignment algorithm and selecting, recommending, or adjusting one or more of the first weak-to-strong annotation alignment algorithm or the at least one other weak-to-strong annotation alignment algorithm based on the comparison.

13. A method performed by a computer, the method comprising:

receiving, from a first source including an annotation alignment service or associated storage device, weak-to-strong annotations for a document that are generated by applying a weak-to-strong annotation alignment algorithm that has weak annotations for the document as an input;

receiving, from a second source, strong annotations for the document;

matching strong annotations from the second source to weak-to-strong annotations from the first source to generate respective pairs of matched annotations;

for each pair of matched annotations, calculating respective metrics for the strong annotation of the pair and the weak-to-strong annotation of the pair, the respective metrics including one or more of: an exact match metric comparing Optical Character Recognition (OCR) text in a first bounding box of the weak-to-strong annotation of the pair to a string of the strong annotation of the pair, an exact raw match metric comparing the OCR text in the first bounding box to OCR text in a second bounding box of the strong annotation of the pair, or an intersection over union metric corresponding to an overlap of the first and second bounding boxes;

aggregating the respective metrics for the pairs of matched annotations to generate aggregated metrics; and outputting an indication of the aggregated metrics to a graphical user interface or a target application, the indication usable to determine a selection or adjustment of the weak-to-strong annotation alignment algorithm for use in generating subsequent strong annotations from weakly annotated data sets for use in OCR operations and to cause the determined selection or adjustment of the weak-to-strong annotation alignment algorithm to be used in generating subsequent strong annotations.

14. The method of claim 13, further comprising calculating a score for a first metric of the respective metrics using aggregated metrics that correspond to the first metric, wherein the score is calculated by: determining a first product of an aggregation of the first metric for the strong annotations multiplied by an aggregation of the first metric for the weak-to-strong annotations, determining a second product of the first product multiplied by two, and dividing the second product by a sum of the first metric for the strong annotations and an aggregation of the first metric for the weak-to-strong annotations.

15. The method of claim 13, wherein aggregating the respective metrics comprises determining, for the strong annotations and the weak-to-strong annotations, respectively, one or more of: a total number of exact matches, a total number of exact raw matches, or a mean intersection over union value using the respective metrics calculated for each pair of matched annotations.

16. The method of claim 13, wherein the weak-to-strong annotation alignment algorithm is a first weak-to-strong annotation alignment algorithm, and wherein the method further comprises performing a comparison of the aggregated metrics to corresponding aggregated metrics of at least one other weak-to-strong annotation alignment algorithm and selecting, recommending, or adjusting one or more of the first weak-to-strong annotation alignment algorithm or the at least one other weak-to-strong annotation alignment algorithm based on the comparison.

17. A system, comprising:

one or more hardware processors with memory coupled thereto;

computer-readable media storing instructions executable by the one or more hardware processors, the instructions comprising:

first instructions to generate an expanded annotated data set for a document, the expanded annotated data set including strong annotations of optical character recognition (OCR) labels for content in the document, each strong annotation including a respective first bounding box and a string, and weak-to-strong annotations resulting from applying a first weak-to-strong annotation alignment algorithm to the labels, each weak-to-strong annotation including a respective second bounding box generated by the weak-to-strong annotation alignment algorithm;

second instructions to, for each label of the OCR labels, match a respective strong annotation to a respective weak-to-strong annotation for the label to form a respective matched pair;

third instructions to calculate individual metrics for the strong annotations and for the weak-to-strong annotations in the expanded annotated data set, the individual metrics including different types of comparisons of aspects of the strong annotations to the weak-to-strong annotations for each respective matched pair;

fourth instructions to aggregate each of the different types of the individual metrics associated with each label of the OCR labels to generate first aggregated metrics;

fifth instructions to execute the first, second, third, and fourth instructions again using a second weak-to-strong annotation alignment algorithm to generate second aggregated metrics;

sixth instructions to compare the first aggregated metrics to the second aggregated metrics; and seventh instructions to output an indication of the comparison of the first aggregated metrics to the second aggregated metrics to a graphical user interface or a target application, the indication usable to cause a selection or adjustment of the first or second weak-to-strong annotation alignment algorithm for use in generating subsequent strong annotations from weakly annotated data sets for use in Optical Character Recognition (OCR) operations and to cause the selection or adjustment of the first or second weak-to-strong annotation alignment algorithm to be used in generating subsequent strong annotations.

18. The system of claim 17, wherein the individual metrics include an intersection over union metric calculated as an area of intersection of the first bounding box of the respective strong annotation and the second bounding box of the respective weak-to-strong annotation divided by an area of a union of the first bounding box of the respective strong annotation and the second bounding box of the respective weak-to-strong annotation.

19. The system of claim 17, wherein the individual metrics include one or both of an exact match metric and an exact raw match metric, wherein the exact match metric is determined to be true when OCR text in the second bounding box of the respective weak-to-strong annotation is exactly equal to the string of the respective strong annotation, and wherein the exact raw match metric is determined to be true when the OCR text in the second bounding box of the respective weak-to-strong annotation is exactly equal to OCR text in the first bounding box of the respective strong annotation.

20. The system of claim 17, wherein the first aggregated metrics include one or more scores, wherein each score of the one or more scores is calculated based on respective aggregated metrics for a corresponding one of the different types of individual metrics.

* * * * *